(12) United States Patent
Rosenberg

(10) Patent No.: US 10,656,807 B2
(45) Date of Patent: *May 19, 2020

(54) SYSTEMS AND METHODS FOR COLLABORATIVE SYNCHRONOUS IMAGE SELECTION

(71) Applicant: Louis B. Rosenberg, San Luis Obispo, CA (US)

(72) Inventor: Louis B. Rosenberg, San Luis Obispo, CA (US)

(73) Assignee: Unanimous A. I., Inc., San Francisco, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/147,647

(22) Filed: Sep. 29, 2018

(65) Prior Publication Data

US 2019/0034063 A1    Jan. 31, 2019

Related U.S. Application Data

(63) Continuation-in-part of application No. 15/959,080, filed on Apr. 20, 2018, which is a continuation of (Continued)

(51) Int. Cl.
*G06F 3/0484* (2013.01)
*G06F 3/0485* (2013.01)
(Continued)

(52) U.S. Cl.
CPC ........ *G06F 3/04842* (2013.01); *E21B 47/122* (2013.01); *E21B 47/18* (2013.01);
(Continued)

(58) Field of Classification Search
CPC .............. G06F 3/04842; G06F 3/0485; G06F 3/04845; G06F 3/04812; G06F 3/04847
See application file for complete search history.

(56) References Cited

U.S. PATENT DOCUMENTS 5,236,199 A    8/1993    Thompson, Jr.
5,400,248 A    3/1995    Chisholm
(Continued)

FOREIGN PATENT DOCUMENTS

CA    2414397    8/2003
EP    3123442    2/2017
(Continued)

OTHER PUBLICATIONS

"Dialogr—A simple tool for collective thinking"; Mar. 25, 2015; http://www.dialogr.com./; 1 page.
(Continued)

*Primary Examiner* — William L Bashore
*Assistant Examiner* — Gregory A Distefano
(74) *Attorney, Agent, or Firm* — Fitch, Even, Tabin & Flannery LLP

(57) ABSTRACT

Systems and methods for real-time collaborative computing and collective intelligence are disclosed. A collaborative application runs on a collaborative server connected to a plurality of computing devices. Collaborative sessions are run wherein a group of independent users, networked over the internet, collaboratively answer questions in real-time, thereby harnessing their collective intelligence. Methods for collaborative selection of a target point on an image displayed on the computing devices. Methods for collaborative zooming and panning of an image displayed on the computing devices.

2 Claims, 20 Drawing Sheets

Related U.S. Application Data application No. 15/936,324, filed on Mar. 26, 2018, application No. 16/147,647, which is a continuation-in-part of application No. 15/910,934, filed on Mar. 2, 2018, application No. 16/147,647, which is a continuation of application No. 15/047,522, filed on Feb. 18, 2016, now Pat. No. 10,133,460, application No. 16/147,647, which is a continuation-in-part of application No. 15/017,424, filed on Feb. 5, 2016, now abandoned, application No. 16/147,647, which is a continuation-in-part of application No. 14/925,837, filed on Oct. 28, 2015, application No. 16/147,647, which is a continuation-in-part of application No. 14/920,819, filed on Oct. 22, 2015, now Pat. No. 10,277,645, application No. 16/147,647, which is a continuation-in-part of application No. 14/859,035, filed on Sep. 18, 2015, now Pat. No. 10,122,775, said application No. 15/910,934 is a continuation of application No. 14/738,768, filed on Jun. 12, 2015, now Pat. No. 9,940,006, application No. 16/147,647, which is a continuation-in-part of application No. 14/708,038, filed on May 8, 2015, now abandoned, said application No. 15/936,324 is a continuation of application No. 14/668,970, filed on Mar. 25, 2015, now Pat. No. 9,959,028.

(60) Provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
*G06F 3/0481* (2013.01)
*G06F 3/14* (2006.01)
*G06F 3/0482* (2013.01)
*G06F 3/0488* (2013.01)
*H04L 29/08* (2006.01)
*H04L 29/06* (2006.01)
*E21B 47/12* (2012.01)
*E21B 47/18* (2012.01)

(52) U.S. Cl.
CPC .......... *G06F 3/0482* (2013.01); *G06F 3/0485* (2013.01); *G06F 3/04812* (2013.01); *G06F 3/04845* (2013.01); *G06F 3/04847* (2013.01); *G06F 3/04883* (2013.01); *G06F 3/1454* (2013.01); *H04L 67/04* (2013.01); *H04L 67/12* (2013.01); *H04L 69/24* (2013.01); *G06F 2203/04806* (2013.01)

(56) References Cited

U.S. PATENT DOCUMENTS

| | | |
|---|---|---|
| 5,808,908 A | 9/1998 | Ghahramani |
| 6,064,978 A | 5/2000 | Gardner |
| 6,480,210 B1 | 11/2002 | Martino |
| 6,903,723 B1 | 6/2005 | Forest |
| 6,944,596 B1 | 9/2005 | Gray |
| 7,031,842 B1 | 4/2006 | Musat |
| 7,158,112 B2 | 1/2007 | Rosenberg |
| 7,489,979 B2 | 2/2009 | Rosenberg |
| 7,542,816 B2 | 6/2009 | Rosenberg |
| 7,562,117 B2 | 7/2009 | Rosenberg |
| 7,603,414 B2 | 10/2009 | Rosenberg |
| 7,624,077 B2 | 11/2009 | Bonabeau |
| 7,831,928 B1 | 11/2010 | Rose |
| 7,856,602 B2 | 12/2010 | Armstrong |
| 7,917,148 B2 | 3/2011 | Rosenberg |
| 7,937,285 B2 | 5/2011 | Goldberg |
| 8,176,101 B2 | 5/2012 | Rosenberg |
| 8,250,071 B1 | 8/2012 | Killalea |
| 8,589,488 B2 | 11/2013 | Huston |
| 8,660,972 B1 | 2/2014 | Heidenreich |
| 8,676,735 B1 | 3/2014 | Heidenreich |
| 8,745,104 B1 | 6/2014 | Rosenberg |
| 8,762,435 B1 | 6/2014 | Rosenberg |
| 9,483,161 B2 | 11/2016 | Wenger |
| 9,710,836 B1 | 7/2017 | O'Malley |
| 9,940,006 B2 | 4/2018 | Rosenberg |
| 9,959,028 B2 | 5/2018 | Rosenberg |
| 10,110,664 B2 | 10/2018 | Rosenberg |
| 10,122,775 B2 | 11/2018 | Rosenberg |
| 10,133,460 B2 | 11/2018 | Rosenberg |
| 10,222,961 B2 | 3/2019 | Rosenberg |
| 10,277,645 B2 | 4/2019 | Rosenberg |
| 10,310,802 B2 | 6/2019 | Rosenberg |
| 10,353,551 B2 | 7/2019 | Rosenberg |
| 10,416,666 B2 | 9/2019 | Rosenberg |
| 10,439,836 B2 | 10/2019 | Rosenberg |
| 2001/0042010 A1 | 11/2001 | Hassell |
| 2002/0042920 A1 | 4/2002 | Thomas |
| 2002/0129106 A1 | 9/2002 | Gutfreund |
| 2002/0171690 A1 | 11/2002 | Fox |
| 2003/0033193 A1 | 2/2003 | Holloway |
| 2003/0065604 A1 | 4/2003 | Gatto |
| 2003/0079218 A1 | 4/2003 | Goldberg |
| 2003/0210227 A1 | 11/2003 | Smith |
| 2003/0227479 A1 | 12/2003 | Mizrahi |
| 2004/0210550 A1 | 10/2004 | Williams |
| 2005/0067493 A1 | 3/2005 | Urken |
| 2005/0075919 A1 | 4/2005 | Kim |
| 2005/0168489 A1 | 8/2005 | Ausbeck |
| 2005/0218601 A1 | 10/2005 | Capellan |
| 2005/0261953 A1 | 11/2005 | Malek |
| 2006/0147890 A1 | 7/2006 | Bradford |
| 2006/0200401 A1 | 9/2006 | Lisani |
| 2006/0204945 A1 | 9/2006 | Masuichi |
| 2006/0250357 A1 | 11/2006 | Safai |
| 2007/0039031 A1 | 2/2007 | Cansler, Jr. |
| 2007/0072156 A1 | 3/2007 | Kaufman |
| 2007/0097150 A1 | 5/2007 | Ivashin |
| 2007/0099162 A1 | 5/2007 | Sekhar |
| 2007/0121843 A1 | 5/2007 | Atazky |
| 2007/0124503 A1 | 5/2007 | Ramos |
| 2007/0208727 A1 | 9/2007 | Saklikar |
| 2007/0209069 A1 | 9/2007 | Saklikar |
| 2007/0211050 A1 | 9/2007 | Ohta |
| 2007/0216712 A1 | 9/2007 | Louch |
| 2007/0220100 A1 | 9/2007 | Rosenberg |
| 2008/0003559 A1 | 1/2008 | Toyama |
| 2008/0015115 A1 | 1/2008 | Guyot-Sionnest |
| 2008/0016463 A1 | 1/2008 | Marsden |
| 2008/0091777 A1 | 4/2008 | Carlos |
| 2008/0103877 A1 | 5/2008 | Gerken |
| 2008/0140688 A1 | 6/2008 | Clayton |
| 2009/0037355 A1 | 2/2009 | Brave |
| 2009/0063379 A1 | 3/2009 | Kelly |
| 2009/0063463 A1 | 3/2009 | Turner |
| 2009/0063991 A1 | 3/2009 | Baron |
| 2009/0063995 A1 | 3/2009 | Baron |
| 2009/0125821 A1 | 5/2009 | Johnson |
| 2009/0239205 A1 | 9/2009 | Morgia |
| 2009/0254425 A1 | 10/2009 | Horowitz |
| 2009/0254836 A1 | 10/2009 | Bajrach |
| 2009/0287685 A1 | 11/2009 | Charnock |
| 2009/0325533 A1 | 12/2009 | Lele |
| 2010/0023857 A1 | 1/2010 | Mahesh |
| 2010/0145715 A1 | 6/2010 | Cohen |
| 2010/0169144 A1 | 7/2010 | Estill |
| 2010/0174579 A1 | 7/2010 | Hughes |

(56) References Cited

U.S. PATENT DOCUMENTS

| | | |
|---|---|---|
| 2010/0199191 A1 | 8/2010 | Takahashi |
| 2010/0205541 A1 | 8/2010 | Rapaport |
| 2010/0299616 A1 | 11/2010 | Chen |
| 2011/0016137 A1 | 1/2011 | Goroshevsky |
| 2011/0080341 A1 | 4/2011 | Helmes |
| 2011/0087687 A1 | 4/2011 | Immaneni |
| 2011/0119048 A1 | 5/2011 | Shaw |
| 2011/0141027 A1 | 6/2011 | Ghassabian |
| 2011/0166916 A1 | 7/2011 | Inbar |
| 2011/0208822 A1 | 8/2011 | Rathod |
| 2011/0276396 A1 | 11/2011 | Rathod |
| 2011/0320536 A1 | 12/2011 | Lobb |
| 2012/0005131 A1 | 1/2012 | Horvitz |
| 2012/0011006 A1 | 1/2012 | Schultz |
| 2012/0013489 A1 | 1/2012 | Earl |
| 2012/0072843 A1 | 3/2012 | Durham |
| 2012/0079396 A1 | 3/2012 | Neer |
| 2012/0088220 A1 | 4/2012 | Feng |
| 2012/0088222 A1 | 4/2012 | Considine |
| 2012/0109883 A1 | 5/2012 | Iordanov |
| 2012/0179567 A1 | 7/2012 | Soroca |
| 2012/0191774 A1 | 7/2012 | Bhaskaran |
| 2012/0290950 A1 | 11/2012 | Rapaport |
| 2012/0316962 A1 | 12/2012 | Rathod |
| 2013/0013248 A1 | 1/2013 | Brugler |
| 2013/0041720 A1 | 2/2013 | Spires |
| 2013/0097245 A1 | 4/2013 | Adarraga |
| 2013/0160142 A1 | 6/2013 | Lai |
| 2013/0171594 A1 | 7/2013 | Gorman |
| 2013/0191181 A1 | 7/2013 | Balestrieri |
| 2013/0231595 A1 | 9/2013 | Zoss |
| 2013/0298690 A1 | 11/2013 | Bond |
| 2013/0300740 A1 | 11/2013 | Snyder |
| 2013/0311904 A1 | 11/2013 | Tien |
| 2013/0339445 A1 | 12/2013 | Perincherry |
| 2014/0047356 A1 | 2/2014 | Ameller-Van-Baumberghen |
| 2014/0057240 A1 | 2/2014 | Colby |
| 2014/0075004 A1 | 3/2014 | Van Dusen |
| 2014/0089521 A1 | 3/2014 | Horowitz |
| 2014/0100924 A1 | 4/2014 | Ingenito |
| 2014/0108915 A1 | 4/2014 | Lu |
| 2014/0128162 A1 | 5/2014 | Arafat |
| 2014/0129946 A1 | 5/2014 | Harris |
| 2014/0162241 A1 | 6/2014 | Morgia |
| 2014/0214831 A1 | 7/2014 | Chi |
| 2014/0249889 A1 | 9/2014 | Park |
| 2014/0258970 A1 | 9/2014 | Brown |
| 2014/0279625 A1 | 9/2014 | Carter |
| 2014/0310607 A1 | 10/2014 | Abraham |
| 2014/0316616 A1 | 10/2014 | Kugelmass |
| 2014/0337097 A1 | 11/2014 | Farlie |
| 2014/0358825 A1 | 12/2014 | Phillipps |
| 2014/0379439 A1 | 12/2014 | Sekhar |
| 2015/0006492 A1 | 1/2015 | Wexler |
| 2015/0089399 A1 | 3/2015 | Megill |
| 2015/0149932 A1 | 5/2015 | Yamada |
| 2015/0154557 A1 | 6/2015 | Skaaksrud |
| 2015/0156233 A1 | 6/2015 | Bergo |
| 2015/0170050 A1 | 6/2015 | Price |
| 2015/0192437 A1 | 7/2015 | Bouzas |
| 2015/0236866 A1 | 8/2015 | Colby |
| 2015/0242972 A1 | 8/2015 | Lemmey |
| 2015/0302308 A1 | 10/2015 | Bartek |
| 2015/0331601 A1 | 11/2015 | Rosenberg |
| 2015/0347903 A1 | 12/2015 | Saxena |
| 2016/0034305 A1 | 2/2016 | Shear |
| 2016/0044073 A1 | 2/2016 | Rosenberg |
| 2016/0048274 A1 | 2/2016 | Rosenberg |
| 2016/0057182 A1 | 2/2016 | Rosenberg |
| 2016/0062735 A1 | 3/2016 | Wilber |
| 2016/0078458 A1 | 3/2016 | Gold |
| 2016/0098778 A1 | 4/2016 | Blumenthal |
| 2016/0154570 A1 | 6/2016 | Rosenberg |
| 2016/0170594 A1 | 6/2016 | Rosenberg |
| 2016/0170616 A1 | 6/2016 | Rosenberg |
| 2016/0209992 A1 | 7/2016 | Rosenberg |
| 2016/0210602 A1 | 7/2016 | Siddique |
| 2016/0274779 A9 | 9/2016 | Rosenberg |
| 2016/0277457 A9 | 9/2016 | Rosenberg |
| 2016/0314527 A1 | 10/2016 | Rosenberg |
| 2016/0320956 A9 | 11/2016 | Rosenberg |
| 2016/0357418 A1 | 12/2016 | Rosenberg |
| 2016/0366200 A1 | 12/2016 | Healy |
| 2017/0223411 A1 | 8/2017 | De Juan |
| 2017/0300198 A1 | 10/2017 | Rosenberg |
| 2018/0076968 A1 | 3/2018 | Rosenberg |
| 2018/0181117 A1 | 6/2018 | Rosenberg |
| 2018/0196593 A1 | 7/2018 | Rosenberg |
| 2018/0203580 A1 | 7/2018 | Rosenberg |
| 2018/0204184 A1 | 7/2018 | Rosenberg |
| 2018/0217745 A1 | 8/2018 | Rosenberg |
| 2018/0239523 A1 | 8/2018 | Rosenberg |
| 2018/0373991 A1 | 12/2018 | Rosenberg |
| 2019/0014170 A1 | 1/2019 | Rosenberg |
| 2019/0042081 A1 | 2/2019 | Rosenberg |
| 2019/0121529 A1 | 4/2019 | Rosenberg |
| 2019/0212908 A1 | 7/2019 | Willcox |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

Beni; "From Swarm Intelligence to Swarm Robotics"; Swarm Robotics WS 2004, LNCS 3342; pp. 1-9; 2005.

Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.

Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.

Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.

Deck et al; "Prediction Markets in the Laboratory"; University of Arkansas and Chapman University; J. Econ. Surv., 2013; 33 pages.

Deneubourg et al; "Collective Patterns and Decision-Making"; Ethology Ecology & Evolution; Mar. 22, 1989; pp. 295-311.

Ding et al; "Time Weight Collaborative Filtering"; CIKM'05, Oct. 31-Nov. 5, 2005; Bremen, Germany; pp. 485-492.

EP; Extended European Search Report for EP Application No. 15767909.3 mailed from the European Patent Office dated Sep. 4, 2017.

EP; Extended European Search Report for EP Application No. 15808982.1 mailed from the European Patent Office dated Nov. 28, 2017.

EP; Extended European Search Report for EP Application No. 15852495.9 mailed from the European Patent Office dated Mar. 21, 2018.

Gauchou et al; "Expression of Nonconscious Knowledge via Ideomotor Actions"; Consciousness and Cognition; Jul. 28, 2011; 9 pages.

(56) References Cited

OTHER PUBLICATIONS

Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
PCT; International Search Report and Written Opinion of the International Searching Authority for PCT/US2017/062095 dated May 23, 2018.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and the Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Human Swarms, a real-time method for collective intelligence"; Proceedings of the European Conference on Artificial Life; Jul. 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=EuRyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/356,777, filed Mar. 18, 2019.
Rosenberg: U.S. Appl. No. 15/959,080, filed Apr. 20, 2018.
Salminen; "Collective Intelligence in Humans: A Literature Review"; Lappeenranta University of Technology, Lahti School of Innovation; 1Proceedings; 2012; 8 pages.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Unanimous A. I.; "What is Swarm Intelligence"; 2015; http://unu.ai/swarm-intelligence/; downloaded Oct. 6, 2016; 3 pages.
USPTO; Examiner Interview Summary for U.S. Appl. No. 15/086,034 dated Feb. 13, 2019.
USPTO; Examiner Interview Summary for U.S. Appl. No. 15/086,034 dated Jan. 9, 2019.
USPTO; Final Office Action for U.S. Appl. No. 14/925,837 dated Aug. 7, 2019.
USPTO; Final Office Action for U.S. Appl. No. 15/086,034 dated Jul. 17, 2018.
USPTO; Non-Final Office Action for U.S. Appl. No. 14/738,768 dated Sep. 8, 2017.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.
USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.

(56) References Cited

OTHER PUBLICATIONS

USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/910,934 dated Oct. 16, 2019.
USPTO; Non-Final Office Action for U.S. Appl. No. 15/922,453 dated Dec. 23, 2019.
USPTO; Non-Final Office Action for U.S. Appl. No. 15/936,324 dated Oct. 21, 2019.
USPTO; Non-Final Office Action for U.S. Appl. No. 15/959,080 dated Nov. 7, 2019.
USPTO; Non-Final Office Action for U.S. Appl. No. 16/130,990 dated Oct. 21, 2019.
USPTO; Non-Final Office Action for U.S. Appl. No. 16/668,970 dated Aug. 15, 2017.
USPTO; Notice of Allowance for U.S. Appl. No. 16/130,990 dated Jan. 21, 2020.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31, 2019.
USPTO; Notice of Allowance for U.S. Appl. No. 15/910,934 dated Jan. 15, 2020.
USPTO; Notice of Allowance for U.S. Appl. No. 15/936,324 dated Dec. 9, 2019.
USPTO; Notice of Allowance for U.S. Appl. No. 16/904,239 dated Jun. 17, 2019.
USPTO; Office Action for U.S. Appl. No. 14/708,038 dated Apr. 23, 2019.
USPTO; Restriction Requirement for U.S. Appl. No. 15/017,424 dated Oct. 2, 2018.
USPTO; Restriction Requirement for U.S. Appl. No. 15/199,990 dated Aug. 1, 2019.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Yeung et al.; "Metacognition in human decision-making: confidence and error monitoring"; Philosophical Transactions of the Royal Society B; 2012; pp. 1310-1321.

SYSTEMS AND METHODS FOR COLLABORATIVE SYNCHRONOUS IMAGE SELECTION

This application is a continuation of U.S. application Ser. No. 15/047,522 entitled SYSTEMS AND METHODS FOR COLLABORATIVE SYNCHRONOUS IMAGE SELECTION, filed Feb. 18, 2016, which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, both of which are incorporated in their entirety herein by reference.

This application is a continuation-in-part of U.S. application Ser. No. 15/959,080 entitled METHODS AND SYSTEMS FOR GAZE ENABLED COLLABORATIVE INTELLIGENCE, filed Apr. 20, 2018, which in turn is a continuation of U.S. application Ser. No. 15/936,324 entitled METHODS AND SYSTEMS FOR REAL-TIME CLOSED-LOOP COLLABORATIVE INTELLIGENCE, filed Mar. 26, 2018, which in turn is a continuation of U.S. application Ser. No. 14/668,970 entitled METHODS AND SYSTEMS FOR REAL-TIME CLOSED-LOOP COLLABORATIVE INTELLIGENCE, filed Mar. 25, 2015, now U.S. Pat. No. 9,959,028, which in turns claims the benefit of U.S. Provisional Application 61/970,885 entitled METHOD AND SYSTEM FOR ENABLING A GROUPWISE COLLABORATIVE CONSCIOUSNESS, filed Mar. 26, 2014, all of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turns claims the benefit of U.S. Provisional Application 61/991,505 entitled METHODS AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 15/910,934 entitled INTUITIVE INTERFACES FOR REAL-TIME COLLABORATIVE INTELLIGENCE, filed Mar. 2, 2018, which in turn is a continuation of U.S. patent application Ser. No. 14/738,768, filed Jun. 12, 2015, now U.S. Pat. No. 9,940,006, which in turn claims the benefit of U.S. Provisional Application 62/012,403 entitled INTUITIVE INTERFACE FOR REAL-TIME COLLABORATIVE CONTROL, filed Jun. 15, 2014, all of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turns claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turns claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, both of which are incorporated in their entirety herein by reference.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turns claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, both of which are incorporated in their entirety herein by reference.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016, which in turns claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

BACKGROUND OF THE INVENTION

1. Field of the Invention

The present invention relates generally to systems and methods for collaborative intelligence, and more specifically to systems and methods for closed-loop, dynamic collaborative intelligence.

2. Discussion of the Related Art

Portable computing devices, such as cell phones, personal digital assistants, and portable media players have become popular personal devices due to their highly portable nature, their ability to provide accessibility to a large library of stored media files, their interconnectivity with existing computer networks, and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Hence, there is a substantial need to provide tools and methods by which groups of individuals, each having a portable computing device upon their person, to more easily contribute their personal will/intent to an emerging collaborative consciousness, allowing the group to collectively answer questions or otherwise express their group-wise will in real-time. Furthermore, there is a need to provide tools and methods that enable groups of users to be informed of the group-wise will that is emerging in real-time. The present invention, as described herein, addresses these and other deficiencies present in the art.

SUMMARY OF THE INVENTION

Several embodiments of the invention advantageously address the needs above as well as other needs by providing an image selection process for a group of users in real-time collaborative control of at least one graphical object, each user of the group associated with one of a plurality of computing devices, each computing device including a display interface, configured to exchange data with a collaboration server, and run a collaboration application, the collaboration server performing the steps of: receiving, from a first computing device of the group, a question; sending of an image associated with the question to the plurality of the computing devices, whereby at least a portion of the image is displayed on a target area of the display interface; moderating a collaborative selection process, whereby a target point on the image is selected, wherein the target point has a location on the image; and sending to the plurality of computing devices the location of the target point, whereby a graphical representation of the target point location on the image is shown on the display interface.

In another embodiment, the invention can be characterized as a motion threshold location selection process for a group of users in real-time collaborative control of at least one graphical object, each user of the group associated with one of a plurality of computing devices, each computing device including a display interface, configured to exchange data with a collaboration server, and run a collaboration application, the collaboration server performing the steps of: determining if a speed of the graphical object has fallen below a motion threshold value; upon determination that the speed of the graphical object has fallen below the motion threshold value, determining if the graphical object speed has fallen below the motion threshold value for more than a time threshold value; and upon determination that the graphical object speed has fallen below the motion threshold value for more than the time threshold value, selecting the current graphical object position as a target position.

In yet another embodiment, the invention can be characterized as a force threshold location selection process for a group of users in real-time collaborative control of at least one graphical object, each user of the group associated with one of a plurality of computing devices, each computing device including a display interface, configured to exchange data with a collaboration server, and run a collaboration application, the collaboration server performing the steps of: determining if a magnitude of a group intent vector has fallen below a force threshold value; upon determination that the magnitude of the group intent vector has fallen below the force threshold value, determining if the magnitude of the group intent vector has fallen below the force threshold value for more than a time threshold value; and upon determination that the magnitude of the group intent vector has fallen below the force threshold value for more than the time threshold value, selecting the current graphical object position as a target position.

In yet another embodiment, the invention can be characterized as an image zoom process for a group of users in real-time collaborative control of at least one graphical object, each user of the group associated with one of a plurality of computing devices, each computing device including a display interface, configured to exchange data with a collaboration server, and run a collaboration application, the collaboration server performing the steps of: receiving a zoom indication, for an image displayed on each of the display interfaces and having a first zoom, from at least one computing device; determining from the at least one zoom indications, a zoom change wherein the zoom change; and sending a zoom signal to the plurality of computing devices indicating the zoom change, whereby each display interface changes the first zoom by the zoom change.

In yet another embodiment, the invention can be characterized as an image panning process for a group of users in real-time collaborative control of at least one graphical object, each user of the group associated with one of a plurality of computing devices, each computing device including a display interface displaying a portion of an image, configured to exchange data with a collaboration server, and run a collaboration application, the collaboration server performing the steps of: determining that the at least one graphical object under collaborative control has interacted with a panning boundary displayed on the display interface; determining a panning indication based at least one the interaction of the at least one graphical object with the panning boundary; and sending to the plurality of computing devices a panning indication, whereby the image is shown panned on the display interface.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
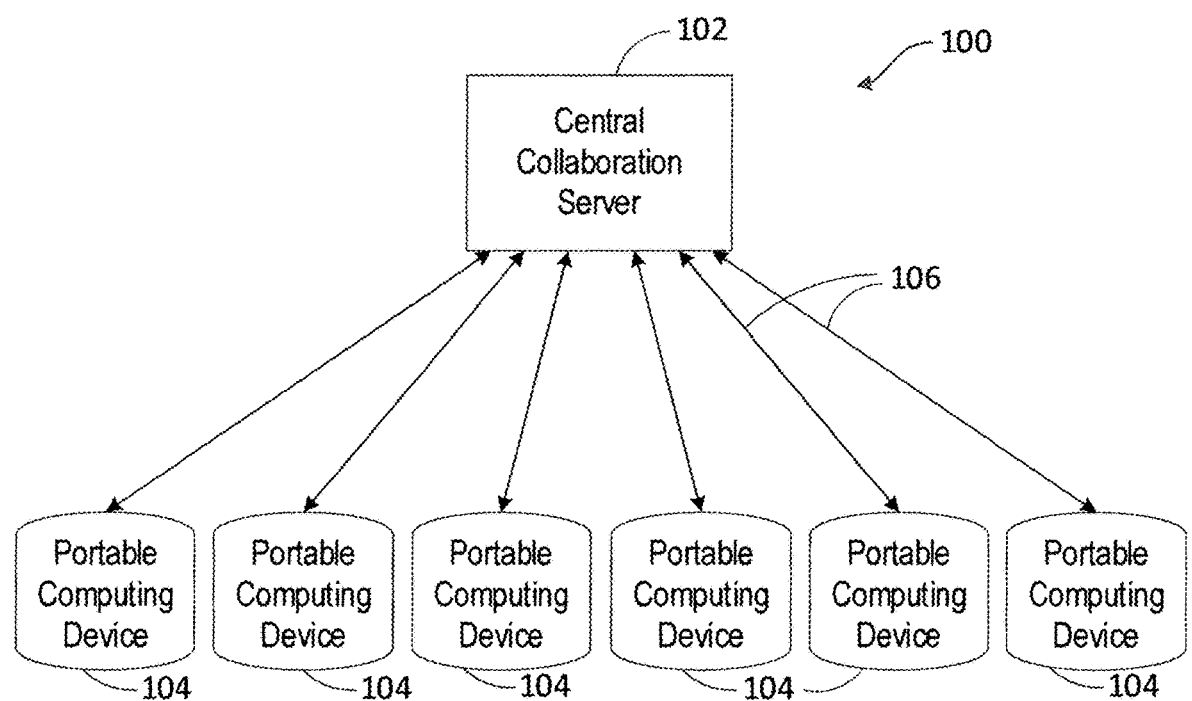
FIG. 1 is a schematic diagram of an exemplary real-time collaborative system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

Prior systems for supporting networked collaboration have been developed, but are asynchronous in nature, letting users provide isolated input, sequentially, the results generated by simple votes, ratings, and/or polling. For example, the present inventor was awarded U.S. Pat. No. 8,745,104 entitled "Collaborative Rejection of Media for Physical Establishments" that describes a novel system for allowing groups of users to reject the media playing in a restaurant or other public venue through sequential polling. While effective for its desired purpose, such systems do not foster a true collaborative intelligence among groups of users. One reason that traditional polls and surveys fail to facilitate collaborative intelligence is that there is no real-time negotiation, users instead imparting "fire and forget" votes or ratings such that collaborators can't explore the options in real-time and converge on common ground. What is needed is a real-time closed loop system and supporting methods that enables groups of networked users to function is a singular synchronous entity—a "social swarm" that can make decision, take actions, or answer questions.

For example, the asynchronous nature of polls and surveys, as used by tools such as Reddit®, Yelp®, and Digg® cause distorted results. This is because the first few individuals to give a vote or rating have a disproportionate impact on the final output. The process is called "herding" or "snowballing" and reflects the fact that voters in asynchronous rating systems are deeply influenced by the votes that precede their own. In a recent study performed by researchers at MIT and Hebrew University of Jerusalem (Muchnik et al.; Science Vol. 341, Aug. 9, 2013), it was found that a single up-vote inserted as the first response on a forum like Reddit, can boost the likelihood of future positive ratings by an average of 32% and can distort the outcome by 25%. The researchers warn that these herding effects are distorting our perceived views on everything from product recommendations on Amazon to electoral polling and market predictions.

To avoid the pitfalls of asynchronous polling and enable a true real-time collaborative intelligence, the present inventor has advanced computer mediated collaboration, transforming the process from the collection of isolated asynchronous input to more sophisticated closed-loop systems that engender real-time synchronous collaboration. What is further needed, however, are systems and methods that enable groups to select an image or a portion of an image through real-time synchronous collaboration. The present invention discloses such systems and methods, including novel systems and methods for placing a graphical pin (or other locative identifier) on an image in a location that is selected collaboratively by a real-time synchronous group of users. In some such embodiments, the image on which a graphical pin is placed is a map, a calendar, or a group of visually separable sub-images (for example images of a set of products, logos, foods, or faces). The present invention discloses novel systems and methods for zooming an image collaboratively by a real-time synchronous group of users.

Also disclosed herein is a new type of swarm replay wherein a group intent vector is shown as a directional arrow across a plurality of time-steps, enabling enhanced visualization of the decision.

The inventive systems and methods that enable a real-time, synchronous, Collaborative Intelligence that can generate and select from among a plurality of suggestions through a computer-moderated multi-round iterative process. The present invention builds upon methods and systems disclosed in prior co-pending applications by the present inventor and hereby incorporated by reference.

As described in related patent application Ser. No. 14/668,970, 14/708,038, 14/738,768 and 14/859,035 by the present inventor, all of which are incorporated by reference, an innovative real-time system has been developed that enables synchronous groups of users to form a coherent swarm intelligence that can collaboratively control a graphical element such as a pointer (or "puck") in order to collectively answer questions, make statements, take actions, select functions, or otherwise respond to prompts. Using the disclosed systems and methods, a "social swarming" platform is enabled that allows users to join one of a plurality of hosted swarms, collaborate with that swarm, earn scores and/or credits and/or rankings based on their performance with respect to others in the swarm, and browse the stored output from other swarms. In some embodiments, groups (i.e. swarms) can compete with other swarms, each of said swarms also earning group-wise scores, credits, and/or rankings with respect to other swarms.

The collaboration system has been developed that allows the group of users to collaboratively control the graphical pointer in order to collaboratively answer questions or otherwise respond to prompts. In one embodiment, each individual user ("participant") engages the user interface on a computing device, conveying his or her individual real-time will in response to a prompt such as a textually displayed (or audibly displayed) question as well as in response to real-time feedback provided to the user of the group's emerging real-time intent. This closes the loop around each user, for he is conveying individual intent while also reacting to the group's emerging intent. Thus each user must be able to see not only the prompt that begins a session, but the real-time group intent as it is forming. For example, if the intent is being conveyed as words, the user will see those words form, letter by letter. If the intent is being conveyed as a direction, the user sees the direction form, degree by degree. If the intent is being conveyed as a choice among objects, the user sees the graphical pointer 210 get closer and closer to a particular chosen object. Thus, the user is seeing the group's will emerge before his eyes, reacting to that will in real-time, and thus contributing to it. This closes the loop, not just around one user, but around all users who have a similar experience on their own individual computing device at substantially the same time. While the embodiments described generally refer to portable computing devices, it will be understood that non-portable computing devices, such as desktop computers, may also be used.

Using the disclosed systems and methods, a "social swarming" platform is enabled that allows users to join one of a plurality of hosted groups (also referred to as swarms), each group comprising a plurality of users. The user may collaborate with that group, earn scores and/or credits and/or rankings based on his performance with respect to others in the group, and browse the stored output from other groups. In some embodiments, groups can compete with other groups, each of said groups also earning group scores, credits, and/or rankings with respect to other groups.

As described in co-pending U.S. patent application Ser. No. 14/668,970, METHODS AND SYSTEMS FOR REAL-TIME CLOSED-LOOP COLLABORATIVE INTELLIGENCE, by the present inventor, which is hereby incorporated by reference, systems and methods have been developed that allows a group of users to collaboratively control the motion of the graphical pointer through a unique group-wise control paradigm. In some embodiments, the collaboratively controlled pointer is configured to allow a group of users to choose letters, words, and/or numbers in response to a prompt posed to the group. This enables the formation a group response that's not based on the will of any individual user, but rather based on the collective will of the group. In some embodiments, the group response comprises a set of letters, numbers, and/or words that form a textual reply to a question or statement posed to the group. In this way, the system disclosed herein enables a group of people to verbally communicate as a single collective intelligence. In some embodiments, the group response may comprise a task performed in response to a prompt, for example the collaborative control of the pointer to draw a picture as a group. We refer to such a collective intelligence herein as a "swarm A.I." for it's an artificial intellect that emerges from the group as a result of unique computer-moderated methods employed herein.

As described in co-pending U.S. patent application Ser. No. 14/708,038 entitled MULTI-GROUP METHODS AND SYSTEMS FOR REAL-TIME MULTI-TIER COLLABORATIVE INTELLIGENCE by the current inventor, which is hereby incorporated by reference, additional systems and methods were disclosed that encourage groups of real-time users who are collaboratively answering questions by controlling the pointer, to produce coherent responses while discouraging incoherent responses. A number of methods were disclosed therein, including (a) coherence Scoring, (b) coherence feedback, and (c) tiered processing. These and other techniques greatly enhance the effectiveness of group-wise collaborative control, incentivizing participants to convey their individual will in a more collaborative and coherent manner. By promoting greater collaboration among members of a real-time group, the result a more focused "swarm intelligence" that produces more coherent answers in shorter amounts of time.

As described in co-pending Provisional patent application Ser. No. 14/738,768, entitled INTUITIVE INTERFACES FOR REAL-TIME COLLABORATIVE INTELLIGENCE, by the current inventor, which is hereby incorporated by reference, systems and additional novel methods were disclosed that provide additional novel systems and methods for user interfacing that make group-wise collaborative control more intuitive for the participating users. More specifically, novel systems and methods were disclosed that enable individual users to intuitively impart their own personal intent upon the graphical pointer that's being collaboratively controlled through real-time synchronous input collected from a plurality of users. Some disclosed embodiments support users interfacing with a mouse, touchpad, trackball, or touchscreen. Other embodiments support users interfacing by tilting a mobile computing device such as a phone or tablet. Some preferred methods employ a manipulatable graphical magnet such that each user positions the magnet so as to impart a simulated pull on the group-wise pointer. The sum (or average) of the plurality of user's individual pulls are then used to influence the group-wise motion of the pointer, thus providing a physically intuitive control paradigm. This and other novel solutions disclosed therein, solved the unique problems posed by enabling real-time synchronous collaborative control of the group-wise pointer, thus enabling more effective "swarm intelligence" systems.

Also disclosed were methods and systems to enable individual users to quickly and easily pose questions to a collaborating group. As described in the co-pending applications, moderating software can be configured to orchestrate which users can ask questions to the group and when.

Once a question is asked, it can be answered through collaborative control methods in which the pointer is enabled to select one of a predefined set of input choices (also referred to as answer choices) displayed (such as YES, NO, MAYBE, PROBABLY, DOUBTFUL) and/or by selecting one of a set of alphanumeric characters. While such methods are highly effective, additional methods were disclosed herein that also allows individuals to specify a set of custom choices (i.e. possible answers) when asking a question to the group. The custom choices are then displayed graphically to the group as spatially arranged elements. The users can then collaboratively select among the spatially arranged elements using the group-wise pointer. This allows for "bounded-set questions" to be asked in a fast and fun manner, making the overall user experience far more enjoyable and efficient.

Also disclosed were innovative hosting methods, allowing large numbers of users to login and participate in collaborative experiences. More specifically, a novel paradigm was disclosed that allows groups of users to enter one of a plurality of on online collaboration groups (referred to herein as swarms) and participate in question/answer sessions. Users can choose among the plurality of swarms, some being public (for groups of strangers), other being private (for groups of friends). The swarms can be general or themed, such that themed swarms are for questions on a particular topic. In some embodiments, swarms can compete with other swarms, bringing the real-time synchronous methods disclosed herein to a higher order, creating a group comprised of groups (i.e. a swarm of swarms). Also disclosed were methods of giving swarms their own unique voice by enabling answers produced by synchronous groups of users to be Tweeted® (via Twitter®). This technology is the first known deployment of Tweets from a consciousness comprised not of a single individual, but a swarm of individuals acting as emergent artificial intelligence.

As described in co-pending U.S. patent application Ser. No. 14/859,035, entitled SYSTEMS AND METHODS FOR ASSESSMENT AND OPTIMIZATION OF REAL-TIME COLLABORATIVE INTELLIGENCE SYSTEMS by the present inventor, and hereby incorporated by reference, systems and additional novel methods were disclosed that enhance collaborative group decisions and actions. As disclosed, each swarm can be configured to dynamically adjust its configuration by adjusting the relative weighting of the input received from members of the swarm. More specifically, in some embodiments, algorithms are used to increase the impact (weighting) that some users have upon the collective pull of the pointer, while decreasing the impact (weighting that other users have upon the collective pull of the pointer. More specifically, user synchrony values (also called user synchronicity values) are computed to reflect each user's contribution to (or resistance of) an emerging consensus in each trial. Users who show a time history of high "sync", have their weighting values increased by the underlying software, while users who show a time history of low "sync" have their weighting values decrease. In this way, the swarm intelligence is adapted over time by the underlying algorithms disclosed herein, strengthening the connections (i.e. input) with respect to the more collaborative users, and weakening the connections with respect to the less collaborative users. In this way, the collaborative swarm in controlled in a manner innovatively reminiscent of an adaptable neural network that optimizes its intelligence over time Also disclosed in Ser. No. 14/859,035 are methods for enabling members of a swarm to ask a question to the group and then collect suggestions populate the possible answers from other members of the swarm. The group then collectively selects upon the options submitted. This technique is referred to herein as "suggestion mode" and can be viewed as an enhanced version of the "custom mode" disclosed in co-pending U.S. patent application Ser. No. 14/738,768. In the custom mode, a user can ask a question and provide a set of answers that the swarm will choose from. In suggestion mode, the user asks a question by indicates that the custom choices are to be collected from any members of the swarm who have ideas for options (i.e. suggestions) to populate the choices. When a suggestion mode question is asked by a member of the swarm, all other members of the swarm are alerted with a pop-up window that asks them for suggestions. A "suggestion timer" is optionally employed, giving the group a fixed time-window to provide suggestions. For example 30 seconds. The system may be configured such that if a minimum of 2 suggestions are not contributed within the 30 second window, the question is terminated. After all, you need at least two choices or the swarm has nothing to do. Conversely, if a full set of suggestions is received before the 30 second time limit is up, the question immediately begins, the group moving the pointer to choose among the suggestions that populated the board. In the event that more suggestions are made than fit on the target area, the first suggestions received from users are used by the software. Conversely, users with higher scores, ratings, sync values, or credit values, may be assigned priority making suggestions.

This method is highly effective, for it allows a swarm to engage in a two-step question and answer process. For example, a swarm might comprise of a small group of friends. One user asks the group a question, entering it into the question box—"What movie should we see tonight?" The user selects suggestion mode. Immediately, that question appears on the screens of all the other users. Also appearing on their screens is a suggestion dialog box, asking them to provide suggestions and giving a time limit (for example, 30 seconds, counting down with a timer). As users enter suggestions, they appear around the target board. In addition, a chat window indicates the name of the user who made each suggestion. When the time is up, or when a full set of suggestions are received, the software starts the answer phase of the session, giving the users collaborative control over the puck. The users then collaboratively move the puck (using the real-time methods disclosed) to one of the choices. That choice is then sent to all members.

Still, new methods and systems are needed to enhance synchronous collaborative decision making and bolster group intelligence. Herein, systems and methods that enable groups to select an image or a portion of an image through real-time synchronous collaboration. This includes novel systems and methods for placing a graphical pin (or other locative identifier) on an image in a location that is selected collaboratively by a real-time synchronous group. In some such embodiments, the image on which a graphical pin is placed is a map, a calendar, or a group of visually separable sub-images (for example images of a set of products, logos, foods, or faces). The present invention discloses novel systems and methods for zooming an image collaboratively by a real-time synchronous group of users.

Referring first to FIG. 1, a schematic diagram of an exemplary collaboration system 100 is shown. Shown are a Central Collaboration Server (CCS) 102, a plurality of portable computing devices 104, and a plurality of exchanges of data with the Central Collaboration Server 106.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running a Collaborative Intent Application ("CIA"). The system 100 is designed to enable the plurality of users, each engaging an interface of one of said computing devices 104, to jointly control a single graphical object, for example a movable graphical pointer 210, through real-time group-wise collaboration. In some embodiments, such as a multi-tier architecture, the portable computing devices 104 may communicate with each other. The CCS 102 includes software and additional elements as necessary to perform the required functions. In this application, it will be understood that the term "CCS" may be used to refer to the software of the CCS 102 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices (answer choices) 208. The computing device 104 could be, for example, a personal computer running the CIA application. It could also be a mobile device such as a smart phone, tablet, headset, smart-watch, or other portable computing device running the CIA. The CIA software code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Figure 2:
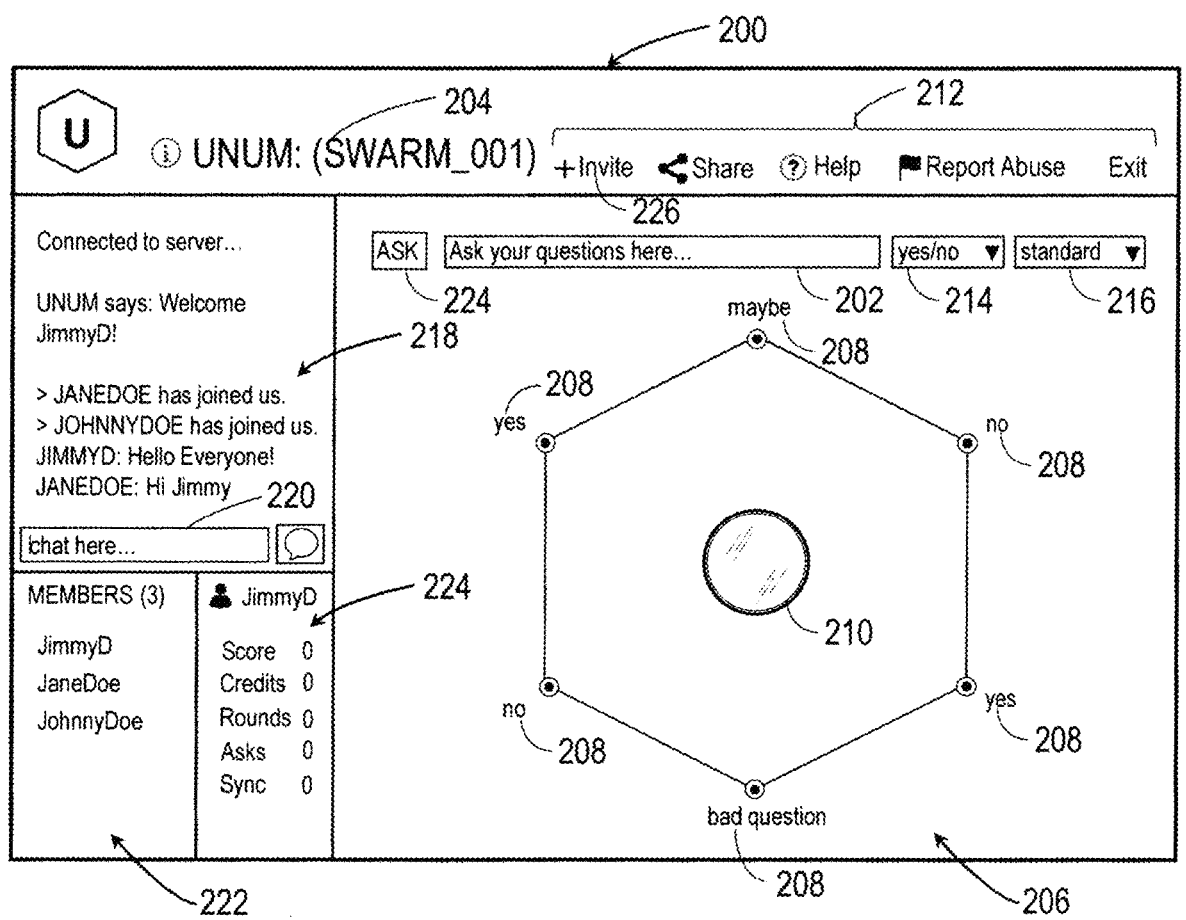
FIG. 2 is an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, a plurality of input choices 208, the pointer 210, a communication menu 212, a board selection drop-down menu 214, a physics selection drop-down menu 216, a chat window 218, a chat input box 220, a current member list 222, a statistics display 224, an invite button 226, and an ask button 228.

The graphical pointer 210 is simultaneously displayed to each user by the CIA running on his computing device 104. The pointer 210 displayed to each user appears in a substantially similar position with respect to a set of input choices 208 (as compared to the position of the pointer 210 on other user's screens). The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below.

In general, the input choices 208 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

Although multiple pointers controlled by multiple swarms is enabled by the innovations of the present invention, for the current discussion we will give examples that are confined to a single swarm. This is for simplicity of description and is not intended to limit the scope of the innovations.

As shown in FIG. 2, the CIA software running on each computing device 104 is configured to display a graphical display interface 200 that includes at least one graphical pointer 210 and the plurality of spatially arranged graphical input choices 208. In the example shown, the graphical pointer 210 is configured to look like a "glass puck" with a central viewing area that is transparent. In the example shown, the input choices 208 are configured as a hexagon of six input choices 208, each input choice 208 including a graphical icon (in the embodiment shown, a dot inside a circle) and an associated word. In this case, the six input choices 208 correspond with possible answers to questions: "Yes", "Maybe", "No", "Yes", "Bad Question", and "No". When the pointer 210 is positioned over one of the input choices 208 such that the input choice 208 is substantially within a centralized viewing area of the pointer 210 for more than a threshold amount of time, that input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six targets for more than the threshold amount of time, that input choice 208 is selected as the answer to a previously asked question.

To ask a question, the user enters the question into the prompt bar 202. Once entered, the user clicks the ask button 228, which sends the question from the CIA software of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a location substantially near a center of the input choice set (i.e. center screen) as if by simulated gravity. In a heavy mode the pointer 210 has substantially higher mass than in standard mode and thus is harder for users to collectively move. In a barrier mode, a set of physical barriers block a direct path to the input choices 208, forcing users to collaboratively guide the pointer 210 around barriers to reach the input choices 208.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than overthinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA of each computing device 104. In some embodiments, in response to receiving the failure indication the CIA terminating user input and displaying the words "Brain Freeze!" on the group interface. In addition, in response to receiving the failure indication all users could lose a number of points and/or credits for the collective failure of the group to guide the pointer 210 to a target. That said, most swarms are successful in guiding the puck to a target. The system 100 is configured to deem a target achieved when the group successfully positions the puck over a target for more than a threshold period of time. When collaboratively controlled targeting is achieved, the answer is displayed on the CIA screens of all the users. Also displayed are statistics for that answer—including the group sync, and that user's user sync. Also displayed are points and/or credits awarded for the current user's participation in the emergent answer.

Figure 3:
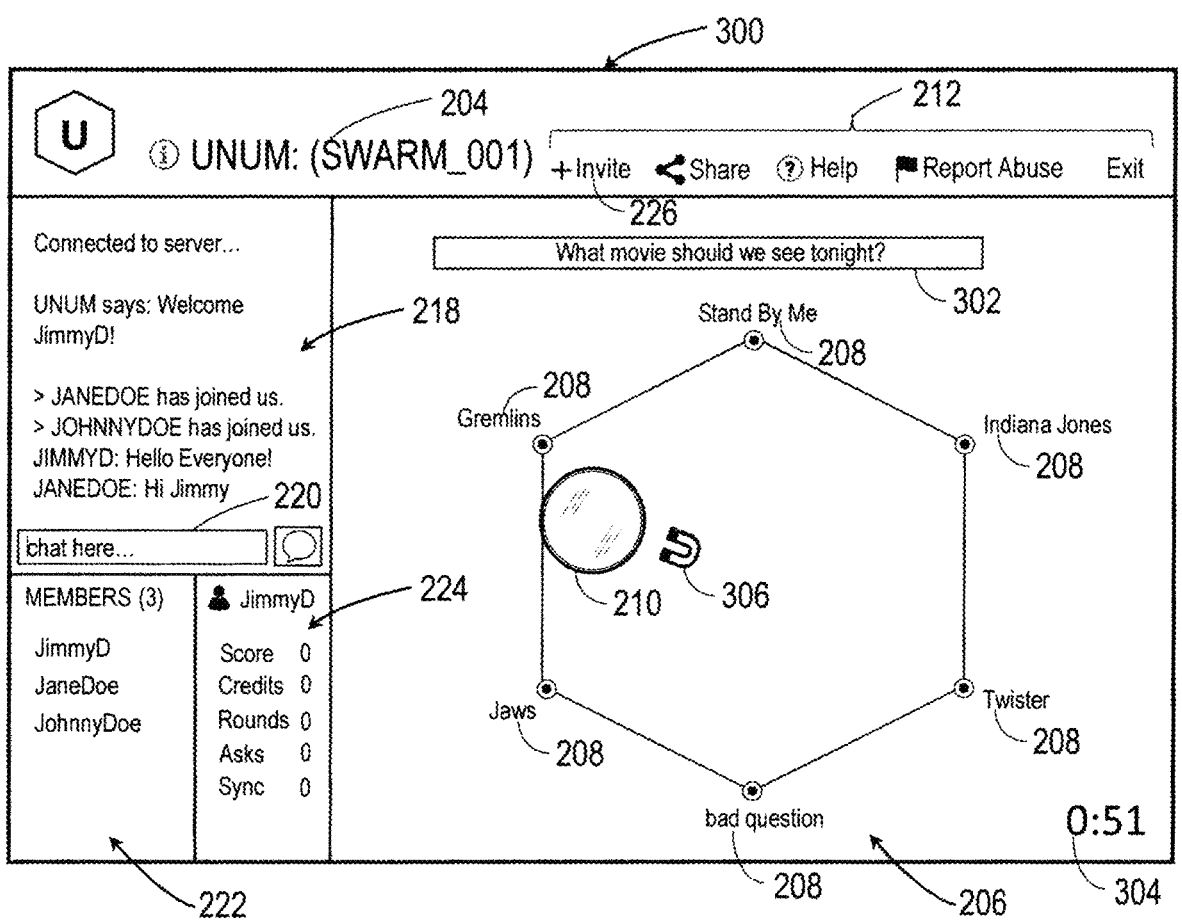
FIG. 3 is an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of input choices 208 from which the users are being asked to collaboratively select from. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"-"2"-"1" countdown timer appears (not shown) to signal the start of the current session. When the session begins, the users are now enabled to provide user input to the pointer 210, guiding it towards one of the input choices 208. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/738,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA is configured to operate the eye tracking hardware and software and receive input from the eye tracking hardware are software. In the current innovation, a user's gaze is tracked by the CIA and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA to compute the magnitude and direction of the user intent vector. In this way, the user can simply look towards a direction that he desires the pointer 210 to move, and the user intent vector is computed by the CIA and sent to the CCS 102 software by the CIA. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the input choices 208, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values, sync values or performance values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity or sync). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm.

Figure 4:
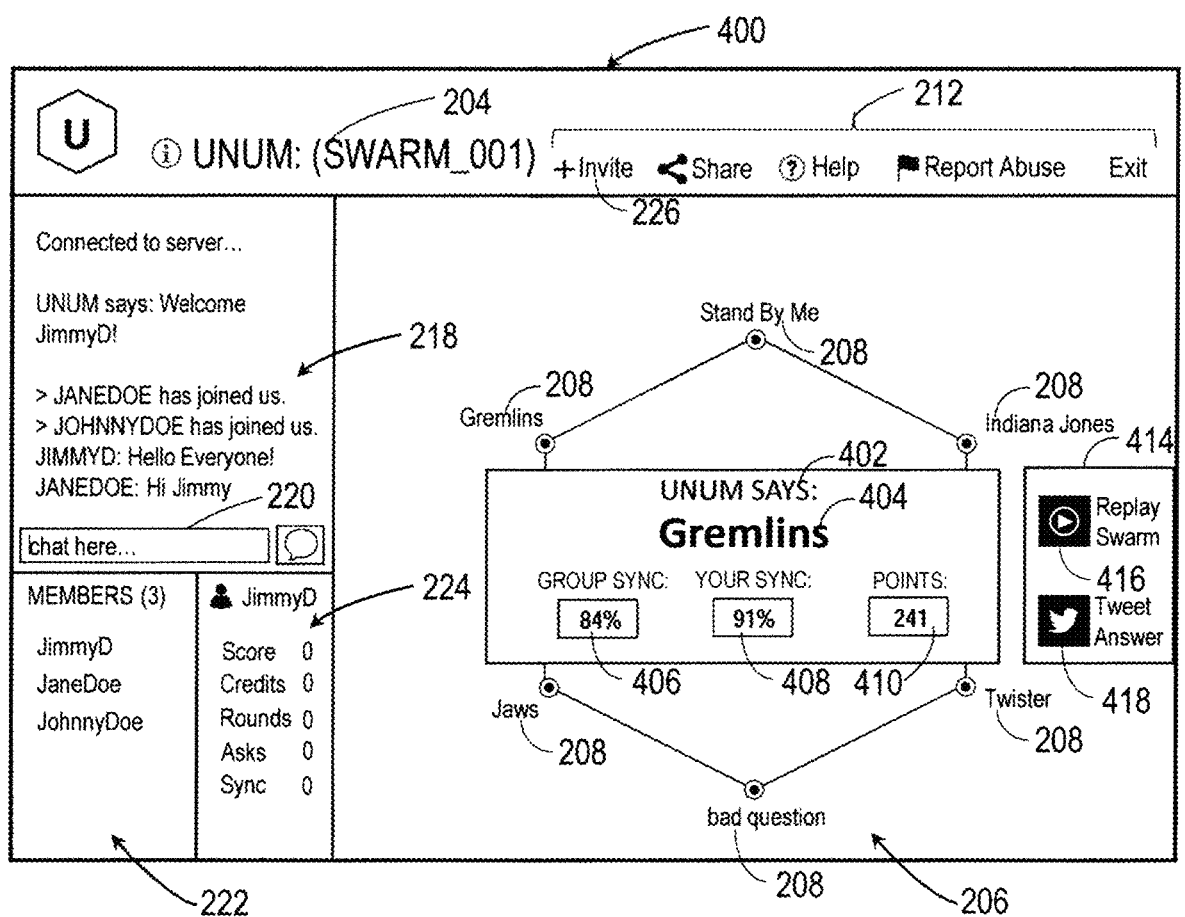
FIG. 4 is an exemplary group display interface of the computing device of the collaborative system after the collaboration session has been successfully completed.

Referring next to FIG. 4, shown is an exemplary display interface 400 as displayed on the computing device 104 being used by one user of a group, shown at a moment in time during the collaborative session after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target is "Gremlins", reflecting the swarm's collaborative will in response to the posed question: "What movie should we see tonight?" As shown in FIG. 4, the target is graphically displayed to each user on the screen of his or her computing device 104 (as controlled by the CIA software running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence.

Also displayed is the answer options tab 414 which gives users options related to the answer that was just reached by the swarm. The user can selectively Tweet® the answer by selecting the Tweet answer icon 418. This triggers a routine within the CIA that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "# UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publically.

As also included in the answer options tab 414, each individual user can select a replay swarm icon 416. Upon selection of the replay swarm icon 416, the session resulting in the current answer is replayed on the display. The swarm replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
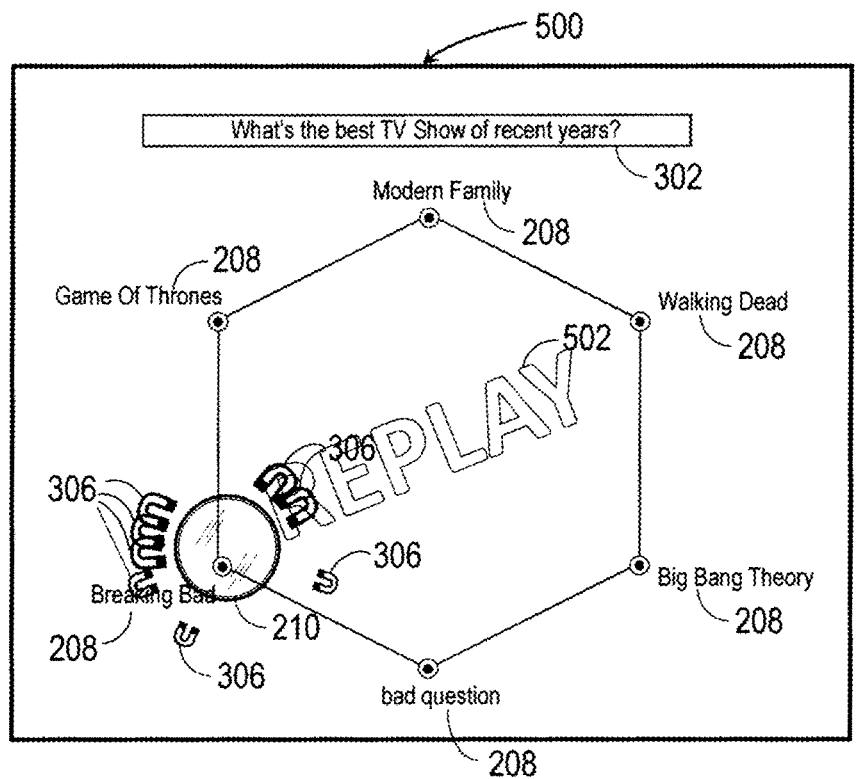
FIG. 5 is a snapshot of an exemplary collaborative session replay video.

Referring next to FIG. 5, a an exemplary session replay video snapshot 500 is shown. Shown are the target area 206, the plurality of input choices 208, the question display 302, the plurality of magnet icons 306, and the replay indication 502.

As shown in FIG. 5, the session replay video includes a representation of the question asked (the question display 302), the answer choices 208, and the graphical indication of the trajectory taken by the pointer 210 during the answer period. As FIG. 5 is a snapshot frame of the replay video, the pointer 210 is shown at a single location, but viewed over time the pointer 210 is shown moving across the target area 206. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users. The target area may also include the replay indication 502 (the text "REPLAY" as shown in FIG. 5), indicating to the user that the session shown is a replay session and not a current session.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed.

In some embodiments, such as shown below in FIG. 6, the replay video can leave a lasting trail of plot points, allowing the user to see how the puck moved under collaborative control. In some such embodiments, an arrow is added to the plot of points, the arrow showing the direction and optionally the magnitude of the group intent vector at each of a plurality of time-steps across the answer period.

Figure 6:
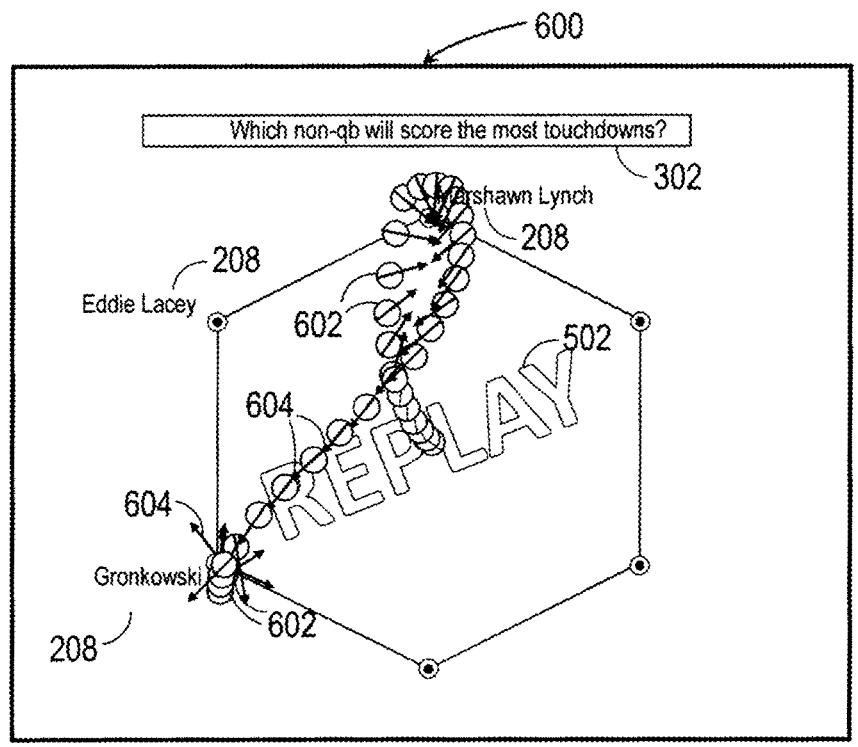
FIG. 6 is an exemplary display of a time history session replay.

Referring next to FIG. 6, an exemplary time history session replay display 600 is shown. Shown are the target area 206, the plurality of answer choices 208, the question display 302, the replay indication 502, a plurality of time-step indicators 602, and a plurality of group intent vector indicators 604.

In the time history session replay display 600, a set of time-steps are displayed simultaneously as the plurality of time-step indicators 602, each time step indicator 602 shows the location of the pointer 210 at that time step. The plurality of group intent vector indicators 604, shown as arrows in the exemplary display 600, are each associated with one time step and each group intent vector indicator 604 shows at least the direction of the group intent vector at that time step. In some embodiments, the magnitude of the group intent vector is indicated by the length of the group intent vector indicator 604. In some embodiments, the size of the arrow of the vector indicator 604 is scaled based on the magnitude of the group intent vector indicator 604. This type of innovative display allows for rapid visualization of the group decision process, presenting as a single image the time-history of puck motion and group intent. In the example display 600 above, the time-history reveals that the group initially considered Marshawn Lynch as the non-quarterback NFL player who would earn the most touchdowns, but the swarm could not reach consensus during the real-time closed-loop collaborative session and instead transitioned the collective will towards Gronkowski. Thus, rather than just seeing the answer that emerged from the group, this type of plot allows a viewer to understand the deliberation process within the "group mind" that emerged.

In some embodiments, the CIA software displays a answer options tab or button, in some embodiments similar to the answer options tab 414 shown in FIG. 4, allowing users to post the replay display image to Instagram®, Twitter, Facebook®, or other social media site. The sharing of such a plot is highly valuable because the single image reveals not just the decision of the collaborative swarm but the deliberation process that produced the decision.

Figure 7:
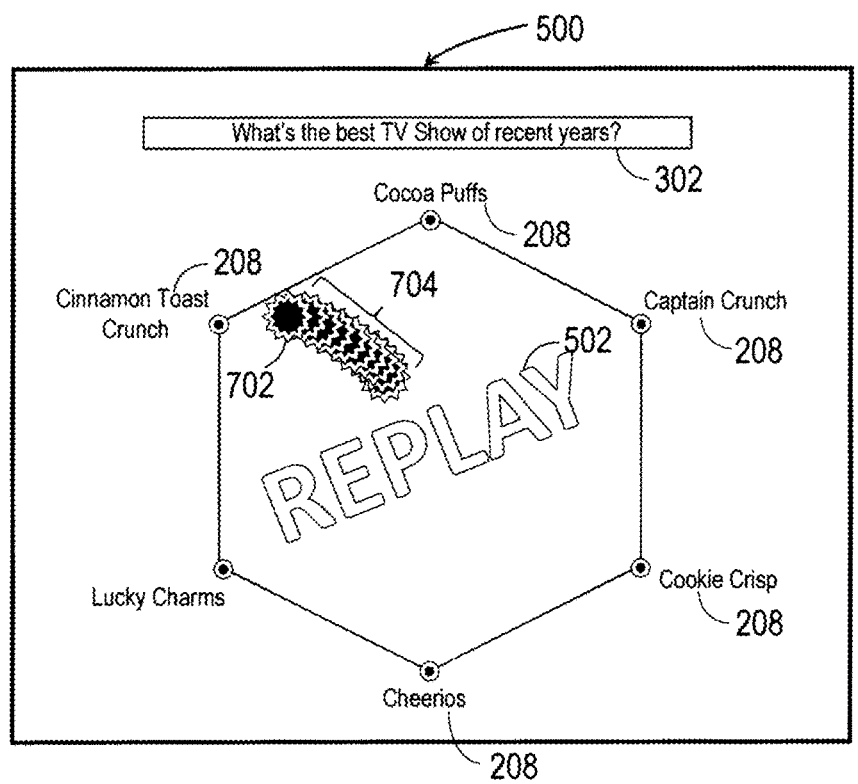
FIG. 7 is a snapshot of an exemplary pointer motion representation session replay video.

Referring next to FIG. 7, a snapshot of an exemplary pointer motion representation session replay video 700 is shown. Shown are the target area 206, the plurality of input choices 208, the question display 302, the replay indication 502, a pointer representation 702, and a pointer motion tail 704.

As in FIG. 5, the snapshot 700 represents a point in time during the session replay video. In the embodiment of FIG. 7, the location of the pointer 210 at the current timestep is represented by the pointer representation 702. In this embodiment the pointer representation 702 is a multipointed star shape, although it will be understood that the pointer representation 702 and the pointer motion tail 704 may be any shapes, sizes and/or colors suitable for conveying the pointer motion information. Motion of the pointer 210 over a defined range of previous timesteps is represented by the pointer motion tail 704. The pointer motion tail 704 indicates the motion of the pointer 210 immediately prior to the current pointer location. In the embodiment shown, each timestep is represented by the same multipointed star shape as for the pointer representation 702, with each newer timestep overlapping the previous timestep, and the pointer representation 702 in front. The graphical effect is similar to a "worm", as the pointer motion tail 704 follows the pointer representation 702 as older timesteps disappear and newer timesteps are added. The pointer motion during the replay is in the form of an animated moving shape with the pointer motion tail 704 representing the past motion of the pointer 210 at the given moment in time. The pointer motion tail 704 is animated to stretch longer when the motion is faster and compress shorter when the motion is slower. The motion during the replay video makes the pointer motion representation resemble a worm or a snake or a slime mold.

There is a significant innovative use for the pointer motion representation session replay video, for the motion of the simulated organism across the screen tends to anthropomorphize the data, helping the users see the collective will of the group as a living thinking creature as they watch the replay in this form. In the exemplary pointer motion representation session replay 700 of FIG. 7, video the animated pointer motion representation "slithers about" the target area 206 based on the previously stored pointer position data and stored group intent vector data of the session, resulting in the the pointer motion representation appearing like a creature that is considering the options and making a decision.

In some embodiments, the software includes the share button (in some embodiments similar to the an answer options tab 414), allowing users to post this animated slime mold replay as a video to Vine®, Instagram®, Twitter®, Facebook®, or other social media sites.

The sharing of such a video is highly valuable because the animation reveals not just the decision of the collaborative swarm but allows users to view it as the Emergent Intelligence of a new entity.

Figure 8:
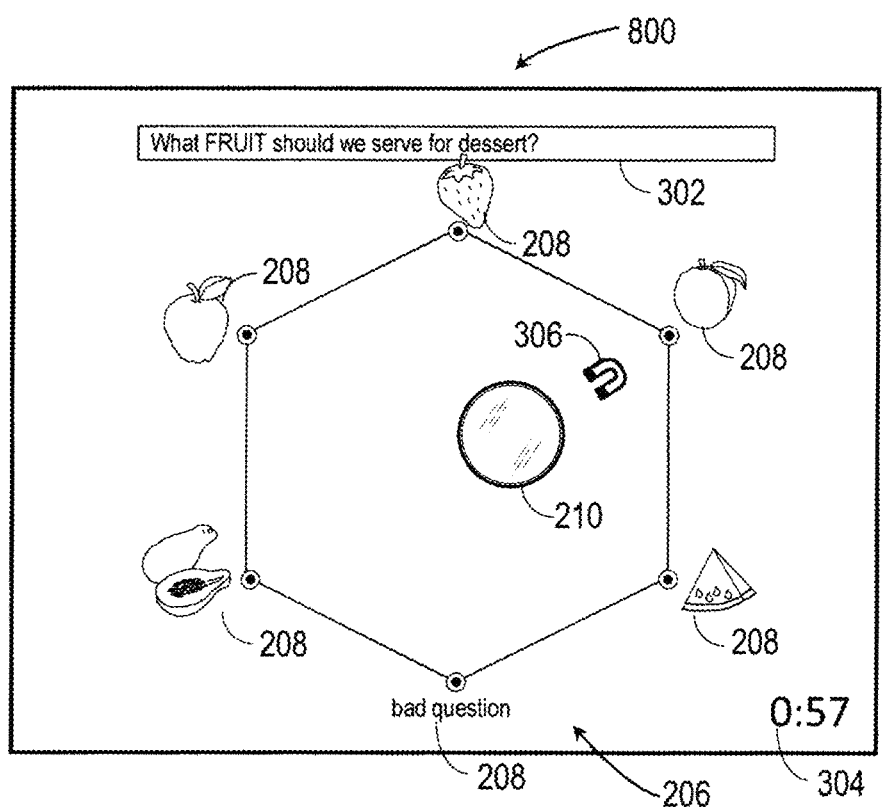
FIG. 8 is an exemplary image target area shown during a collaborative session.

Referring next to FIG. 8, an exemplary discrete image target area 800 is shown. Shown are the target area 206, the question display 302, the countdown clock 304, the pointer 210, the magnet icon 306, and the plurality of answer choices 208.

In the discrete image target area 800 of FIG. 8 the answer choices 208 are represented as images. For example, one answer choice 208 comprises an image of a strawberry, representing the answer choice of "strawberry". In some embodiments the answer choices 208 comprise video. As with previous target areas, each answer choice 208 is associated with a graphical target, whereby selecting of the graphical target using the collaborative process selects the associated answer choice 208.

The group collaboratively selects among the discrete image answer choices 208 by working together in real-time to move the pointer (puck) 210 to the graphical target associated with one of the images. This system is functional, but does present some new issues to be resolved. Most significantly, the system requires the storage and message passing of images or videos, which slows communication time. For the embodiment where each answer choice 208 image is passed separately, even if the images are referenced as URLs, this requires a plurality of URLs to be passed to each computing device 104 for each question that involves the plurality of answer choice images (or videos). This also requires the asker of the question to identify the plurality of answer choice 208 images and specify their location around the target area 206 when asking a question. For users, this can involve identifying a plurality of image URLs which can be time consuming. And finally, it means that data must be stored for all images in a database if we want to allow users to replay questions at a later date.

To provide a more efficient and more flexible model for image selection, an alternate paradigm has been developed wherein a single target area image 1102 is presented to the users, referenced by a single URL, said image including a plurality of possible answer choice 208 images within it, as shown below in FIG. 11. Selection of the answer choice image itself constitutes selection of the target. In some embodiments, that single target area image 1102 may include a number of discrete answer choice 208 images, (such as food images, logos, product images, etc.), wherein the group selects one of the answer choice 208 images included in the image 1102. The answer choice 208 images are separated spatially such that they can be individually targeted by the collaboratively controlled pointer 210. In other embodiments, the single target area image 1102 may include a calendar with a set of discrete boxes for days, which can be each be individually targeted by the collaboratively controlled pointer 210. In other embodiments, the single target area image 1102 may include an analog range of possible target area selections—for example, a graphical map wherein any pixel is a possibly targeted location on the map. Thus, by presenting a single image with flexible target locations, it becomes much easier to ask the question.

To select one answer choice 208 within the target area image 1102, the collaborative swarm may be enabled to place a graphical pin 1402 or other graphical location indicator on a chosen location upon the single target area image 1102. The location of this graphical pin 1402 represents the chosen target location decided upon by the collaborative swarm through the real-time synchronous control of the pointer 210 (i.e. puck). The pin 1402 is then displayed upon the target area image 1102 as a means of presenting the target answer to the question.

Figure 9:
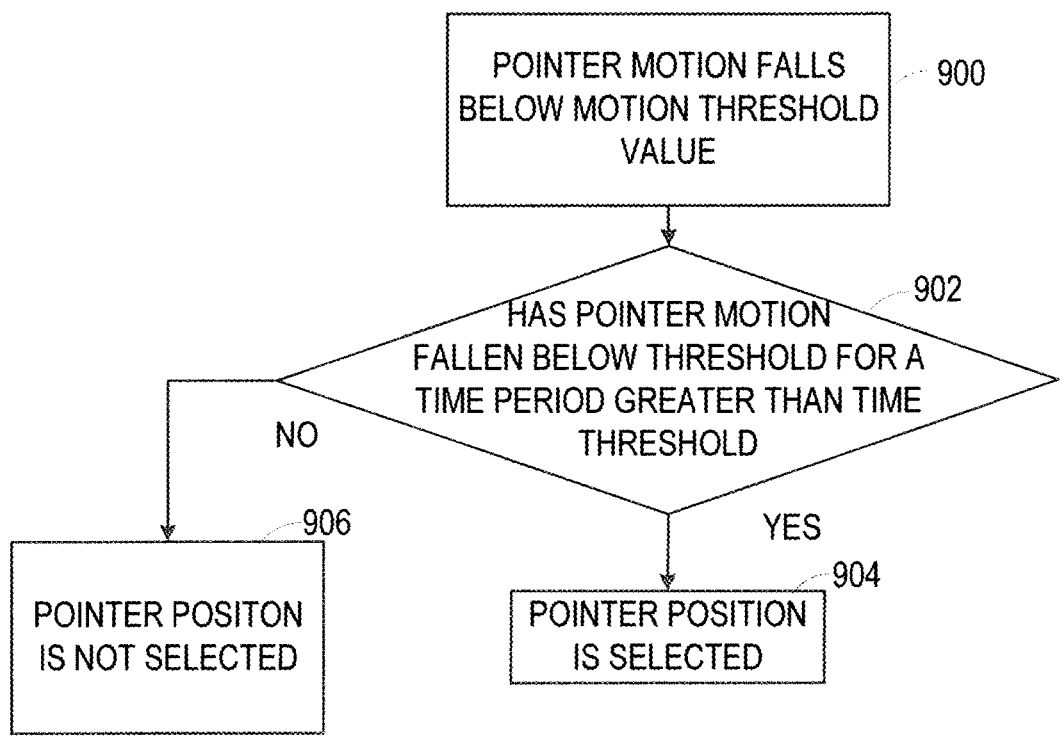
FIG. 9 is a flowchart diagram of a method for location selection by motion threshold during a collaborative session.

Referring next to FIG. 9, a flowchart of a method for location selection by motion threshold is shown. Shown are a motion threshold step 900, a time threshold decision point step 902, a select position step 904, and a position not selected step 906.

The method for location selection by motion threshold occurs during the collaborative session while the users are actively directing the pointer 210, with the group intent vector represented on the target area 206 by the motion of the pointer 210 across the target area 206 as described in the related applications. Two values are previously defined and stored by the CCS 102: a motion threshold value and a time threshold value.

In some embodiments, the motion threshold is a speed, i.e. a distance per time. If the speed of the pointer during the collaborative session is less than the motion threshold value, it is determined to have fallen below the motion threshold. In one embodiment the distance is defined as a number of pixels. For example the motion threshold value could be 5 pixels per second. Thus if the pointer's motion falls below the rate of change of 5 pixels per second (i.e. speed), the pointer motion is determined to have fallen below the motion threshold.

The time threshold value is a period of time for which the pointer speed must be below the motion threshold value. The time threshold value could be, for example, 4 seconds. If the pointer speed drops below the motion threshold value for more than the time threshold value amount of time, the CCS 102 determines that the collaborative group selects the current pointer location as the collaborative decision.

In the first motion threshold step 900, the CCS 102 is running an algorithmic process to determine if the pointer speed has fallen below the motion threshold value, and has determined that the pointer speed has fallen below the motion threshold value. The method then proceeds to the next time threshold decision point step 902.

In the time threshold decision point step 902, the CCS 102 determines whether the pointer speed has fallen below the motion threshold value for a period of time more than the time threshold value. If the pointer speed falls below the motion threshold value for more than the time threshold value, the method proceeds to the select position step 904 and the current pointer position is selected as the target.

If the pointer speed has not fallen below the motion threshold for the period of time, the method proceeds to the position not selected step 906, and the pointer position is not selected, and the collaborative session continues.

Referring again to FIG. 9, two threshold values are defined for use in the location selection by motion threshold process, one being the motion threshold value and one being the time threshold value. The algorithmic process is then run by the CCS 102 software to determine if the pointer's collaboratively controlled speed falls below the motion threshold value for more than the time threshold value amount of time.

Of course, falling below the motion threshold is not enough to indicate that the group desires to select a particular location. That's because the speed of the pointer could simply be changing direction and thus pass through a rate-of-change that falls below the motion threshold value as the puck slows down, stops, then proceeds in a different direction. This is why we also employ the time threshold value The time threshold value is the period of time for which the motion threshold must be met. The time threshold value could be, for example, 4 seconds. Thus, if the pointer speed drops below the motion threshold value for more than the time threshold value amount of time, the CCS 102 determines that the collaborative group desires that the pointer location is selected as the collaborative decision. This could be, for example, the set of values such that the puck motion needs to fall below 5 pixels per second for more than 4 seconds.

Figure 10:
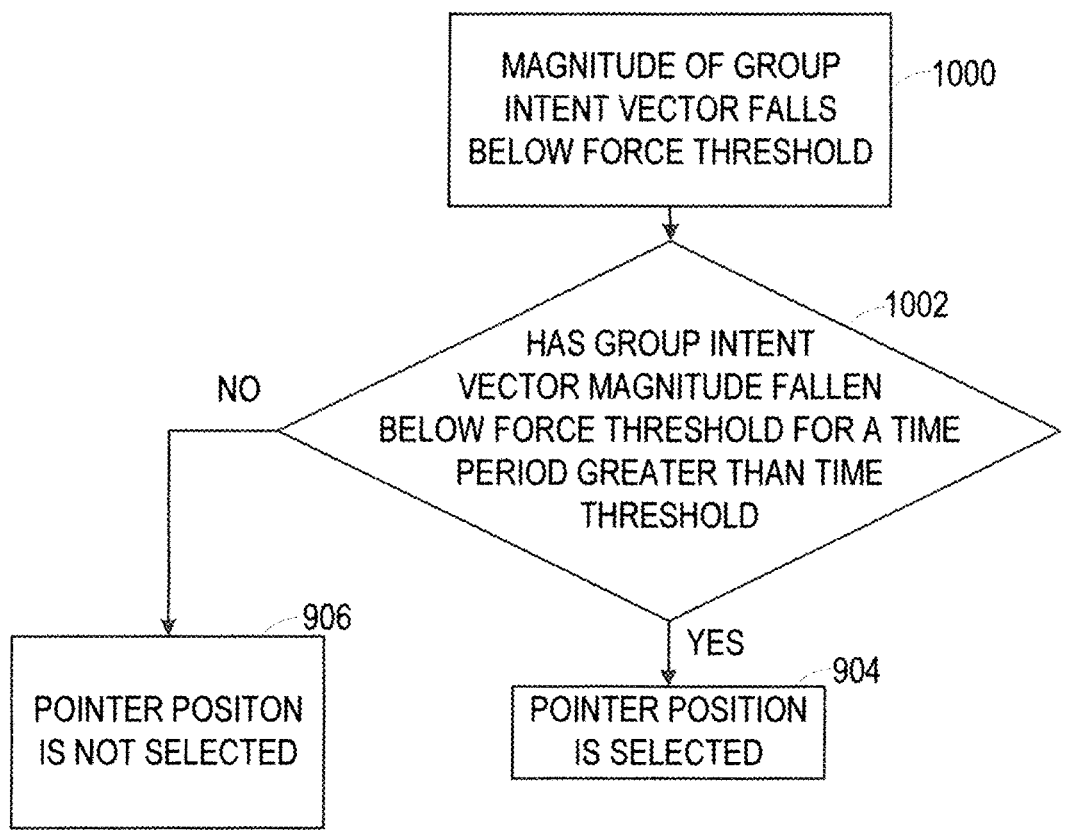
FIG. 10 is a flowchart diagram of a method for location selection by force threshold during a collaborative session.

Referring next to FIG. 10, a flowchart of a method for location selection by force threshold is shown. Shown are a force threshold step 1000, the time threshold decision point step 1002, the select position step 904, and the position not selected step 906.

In another embodiment, the CCS 102 assesses a group intent vector, wherein the group intent vector is a magnitude and direction derived from all the user inputs indicating desired movement of the pointer, as previously described in the related applications. If a magnitude of the group intent vector falls below a force threshold value for more than the time threshold value amount of time, it is determined that the collaborative swarm of users desire to target the current pointer location. In some embodiments, the force threshold value is defined as a percentage of the total possible force magnitude that can be applied by the collaborative swarm if all users were pulling in the same direction at the same time. The force threshold value could be, for example 5% of the maximum possible force magnitude. The time threshold could be, for example, 4 seconds.

In the first force threshold step 1000, the CCS 102 is running an algorithmic process to determine if the group intent vector magnitude has fallen below the force threshold value, and has determined that the group intent vector has fallen below the force threshold value. The method then proceeds to the next time threshold decision point step 902.

In the time threshold decision point step 1002, the CCS 102 determines whether the group intent vector magnitude has fallen below the force threshold value for a period of time more than the time threshold value. If the group intent vector magnitude falls below the force threshold value for more than the time threshold value, the method proceeds to the select position step 904 and the current pointer position is selected as the target.

If the group intent vector magnitude has not fallen below the force threshold for the period of time, the method proceeds to the position not selected step 906, the pointer position is not selected, and the collaborative session continues.

Referring again to FIG. 10, in one example the force threshold value is 5% of the maximum possible force, and the time threshold value is 4 seconds. The CCS 102 determines that the group of collaboratively controlling users wishes to target a location with the graphical pointer if the group intent vector applied to the pointer falls below 5% of the maximum possible force for more than 4 seconds. This method is highly effective because it accounts both for users who choose to stop pulling as well as users whose pulls cancel out with other users. This gets directly at the collaborative will of the swarm as its own unique and distinct intelligent entity.

In some embodiments, the threshold values used in the location selection by motion threshold method and the location selection by force threshold method above are not fixed, but change during the time period of a response. More specifically, the threshold values used in the location selection by motion threshold method and the location selection by force threshold method above can be inventively configured to be increased over time, during the period of a response. This is highly effective at ensuring that a group comes to a decision, for as the period of indecision lingers, the thresholds for determining selection are increased.

In some embodiment, the motion threshold value increases, with the increase starting at the beginning of the collaborative session or the increase starting when a time period has elapsed during the current session. For example, in one inventive embodiment, the motion threshold used by the CCS 102 software to determine if the group has selected a location on the single image 1102 starts at a minimum value and is increased over time during the selection period until reaching a maximum value. In some such embodiments, the increase happens linearly over time. In other embodiments, the increase happens at discrete time intervals. For example the motion threshold could be configured with an initial maximum value of 5 pixels per second. The software can then be configured to start increasing that threshold after the time period of the collaborative decision process has exceeded an elapsed time of 30 seconds. Then, during the next 30 seconds, the motion threshold can be configured to be increased by 1 pixel per second every 5 seconds.

This method allows the group to deliberate collaboratively, requiring the pointer 210 in the initial stage of the collaborative session to reduce the pointer speed to less than 5 pixels per second in order to collaboratively make a decision. But, if the group is having a hard time making a decision, as indicated by the elapsed time of the response exceeding a certain period (e.g. 30 seconds), the motion threshold for determining a collaborative decision is eased. This easing of the motion threshold will allow the group a better chance of reaching an identified collaborative decision. The same process can be inventively employed in location selection by force threshold method increasing the force threshold value. The same process can be inventively employed on the threshold time value, but instead of increasing the time threshold value, the CCS software is configured to decrease the time threshold value across the elapsed time of the collaborative decision process. In some embodiments, the CCS 102 software is configured, upon determining that the collaborative decision process has lingered beyond a time interval, such as 30 seconds, to increase the simulated damping in the physics model for puck motion. This assists the collaborative group in converging upon a decision, for the increased damping resists the stray motion of the puck 210, allowing the puck 210 to settle on an answer easier.

Figure 11:
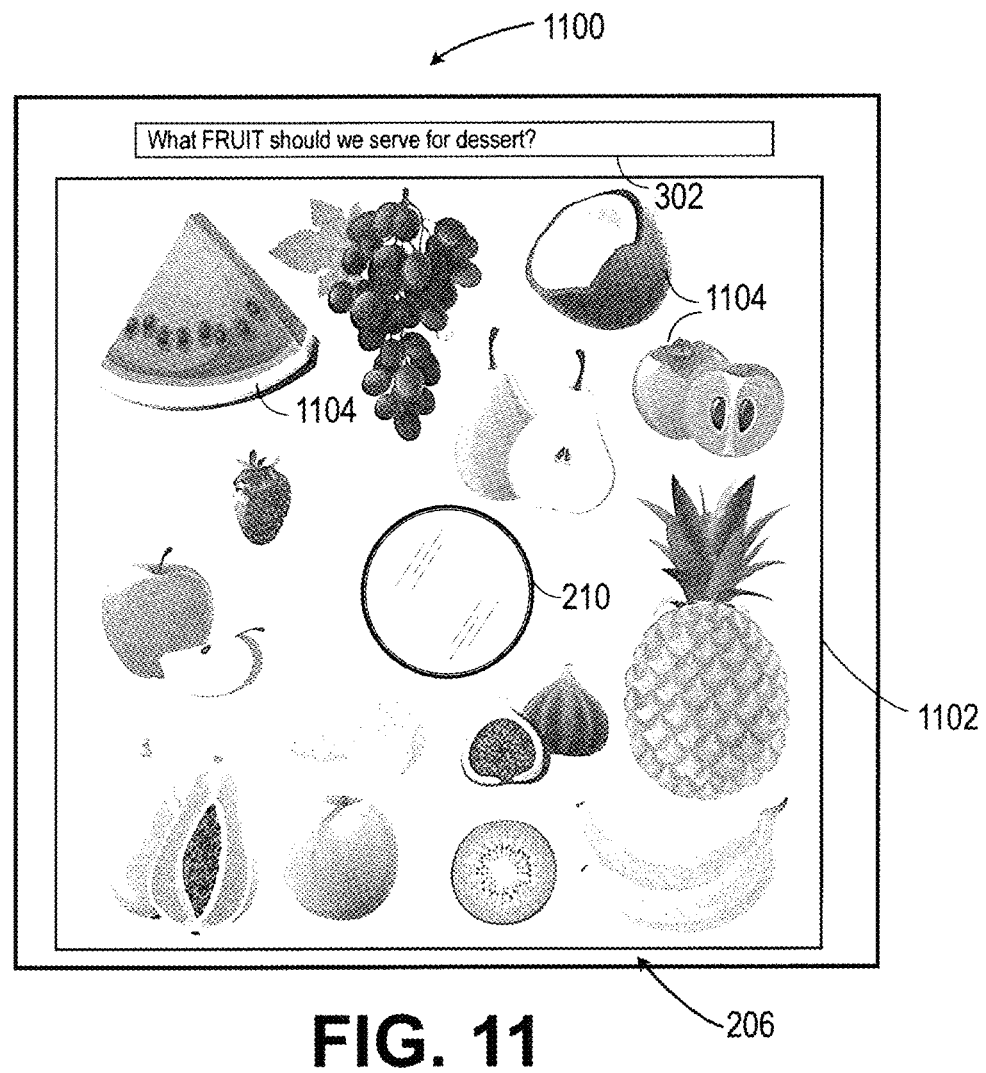
FIG. 11 is an exemplary image target area shown prior to the start of a collaborative session.

Referring next to FIG. 11, an exemplary image target area 1100 is shown prior to the start of the collaborative session. Shown are the target area 206, the question display 302, the pointer 210, the target area image 1102, and the plurality of target images 1104.

As described previously is FIG. 8, the target area image 1102 may be used to provide greater target selection flexibility, instead of selection being limited to the answer choices arrayed on the target area 206, for example in the hexagon configuration previously described.

As shown in the exemplary image target area 1100 of FIG. 11, the single image 1102 is displayed in the target area 206 that allows for the presentation of the number of discrete target images 1104 within the image 1102. The image 1102 is shown bounded by a rectangular box for illustration purposes, but typically an extent of the image 1102 within the target area 206 will not be graphically displayed on the target area 206.

In the exemplary image target area 1100, the target images 1104 included are illustrations of fruit, similar to the answer choices 208 shown in FIG. 8. But here, instead of needing multiple image files and multiple designated answer choices 208, the image 1102 can be presented by the user without any representations being conveyed as to the content of the image or the location of the answer choices 208. The CCS 102 software, in fact, needs not to convey anything about locations to the computing devices 104—the CCS 102 software just needs to send the image 1102 to the plurality of computing devices 104 for display, send the representation of the question to the group, and moderate the collaborative session, whereby the group places the pointer 210 on a location on image 1102, which becomes the target. The meaning of the target is inherent in the understanding of the users participating.

As shown in the FIG. 11, the target area image 1102 is presented to users on their portable computing devices 104. This is generally achieved by a single URL being included with the question, the URL providing a link to the single target area image 1102. The image 1102 is displayed on the screens of the users, along with the collaborative pointer 210, and along with the question display 302, "What fruit should we serve for dessert?" The image 1102 includes the plurality of target images 1104, distinct graphical objects that are known to the users as unique objects that can be selected among. This said, the software need not know the location of the target images 1104 within the single image 1102. This makes the method highly efficient from a processing and communication perspective. The pointer 210 is generally displayed initially at the center of the image 1102 (as shown in FIG. 11), in an open area of the target area image 1102. Thus it is up to the user to choose or craft the target area image that has an empty area in the center where the puck 210 would start (or other suitable area within the image 1102).

In general, a "3, 2, 1" countdown is presented to all users prior to the start of the collaborative session, as disclosed in the prior applications. Then the users collaboratively control the pointer 210, for example using the graphical magnet icon 306 as previously disclosed. In many preferred embodiments, each user only sees his or her own magnet icon 306, while watching the collectively influenced motion of the puck 210. In other embodiments, each user can see their own magnet icon 306, as well as ghosted images of other user's magnet icons 306. This generally appears as a real-time swarm of magnets, the motion and flow of the swarm being highly informative.

Figure 12:
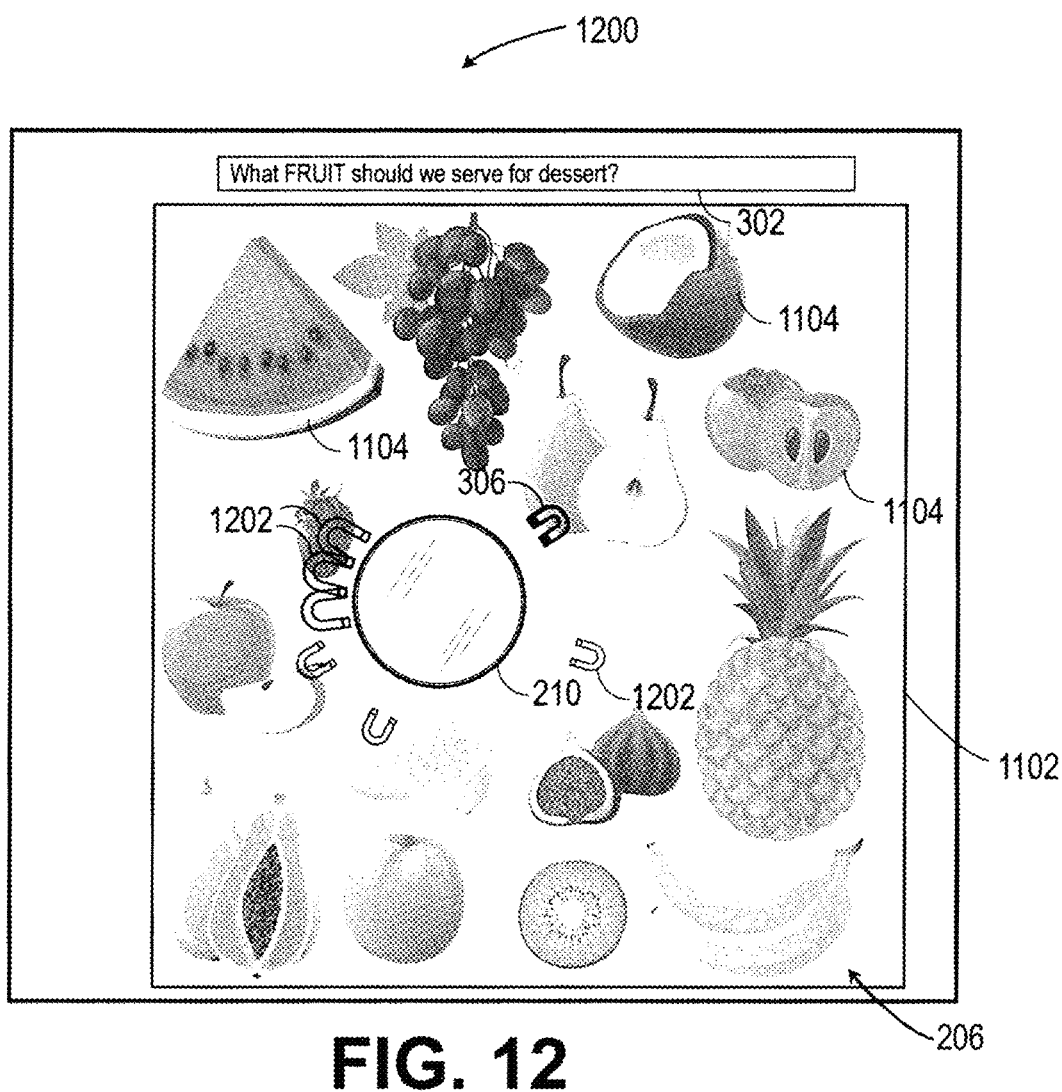
FIG. 12 is an exemplary image target area shown during a collaborative session.

Referring next to FIG. 12, an exemplary image target area 1200 is shown during a collaborative session. Shown are the target area 206, the question display 302, the pointer 210, the target area image 1102, the plurality of target images 1104, the magnet icon 306, and the ghosted magnet icons 1202.

During the collaborative session, the pointer 210 is in motion under collaborative control of the real-time group of users participating in the closed-loop dynamic system. In the embodiment shown in FIG. 12, the magnet icon 306 indicates the intent of the user, while the ghosted magnet icons 1202 indicate the intents of the other users of the group.

As shown in FIG. 12, the pointer 210 is in motion over the single target area image 1102 which includes the number of discrete target images 1104 or locations that are knowable to the users (in this case images of fruits). The users are pulling the pointer 210 collaboratively through real-time closed-loop control, each user applying a force upon the pointer 210 through their own control of the graphical magnet icon 306 as shown in FIG. 12.

It should be noted that FIG. 12 represents a single time-step across an answer period that might take 10 to 60 seconds of pointer motion. The CCS 102 software is monitoring pointer motion during this time, determining if the users desire the pointer 210 to target a particular location within the target area image 1102. This is determined, for example, using either the selection method of FIG. 9, the selection method of FIG. 10 or a combination thereof.

At each particular time-step, the CCS 102 software determines whether the target selection criteria has been met either the selection method of FIG. 9 of the selection method of FIG. 10 (or both, if used in combination). This happens when the pointer 210 is in a position, for example, as shown in FIG. 13 below.

Figure 13:
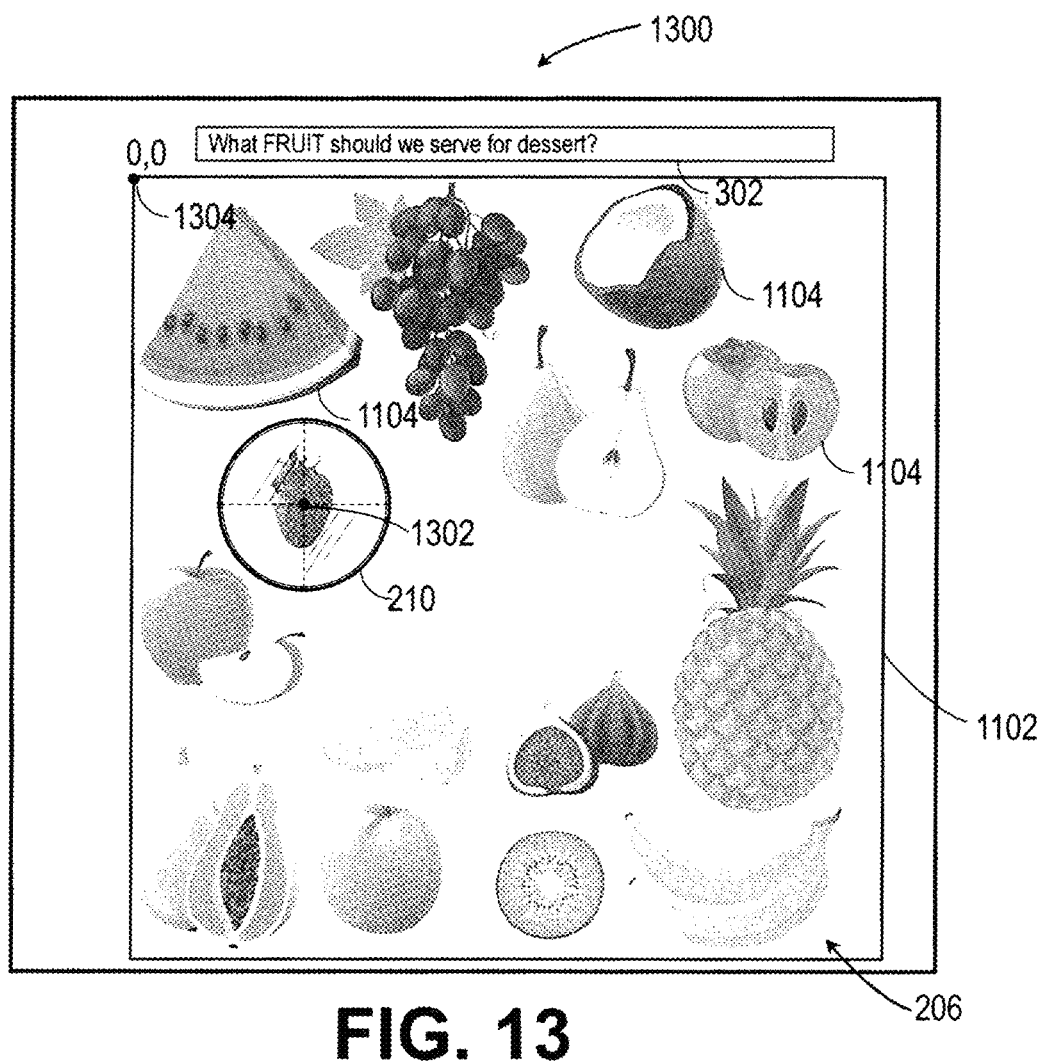
FIG. 13 is an exemplary image target area shown after a target image has been selected by the collaborative session.

Referring next to FIG. 13, an exemplary image target area 1300 is shown after a target image has been selected by the collaborative session. Shown are the target area 206, the pointer 210, the question display 302, the target area image 1102, the plurality of target images 1104, a target point 1302, and a coordinate origin 1304.

As shown in FIG. 13, the group has selected the target point 1302 of the target area image 1102. The selected target point 1302 is such that a particular target image 1104, in this case a strawberry image, is located within the lens of the pointer 210. But because of the highly efficient nature of this method, the CCS 102 software need not have any knowledge (i.e. data) indicating that there is a particular object displayed at the target point 1302. This is evident to the users, who use their visual senses to all come to that same conclusion, but the software need not concern itself with that fact. Instead, the software simply knows that the users have targeted the target point 1302, defined by an X and Y coordinate, within the image 1102. This is all that the software needs to record and convey to the plurality of computing devices 104.

Thus, the CCS 102 software determines that the pointer 210 has targeted the target point 1302 with coordinates (TargetX, TargetY) within the target area image 1102. The target point 1302 coordinates can be referenced with respect to the coordinate origin 1304 of the image 1102, for example an upper left corner of the image 1102, referenced as 0,0.

The CCS 102 software then communicates to the computing devices 104, that the target point 1302 has been selected by the group and that the target point 1302 is at the X-Y coordinate location (TargetX, TargetY).

Figure 14:
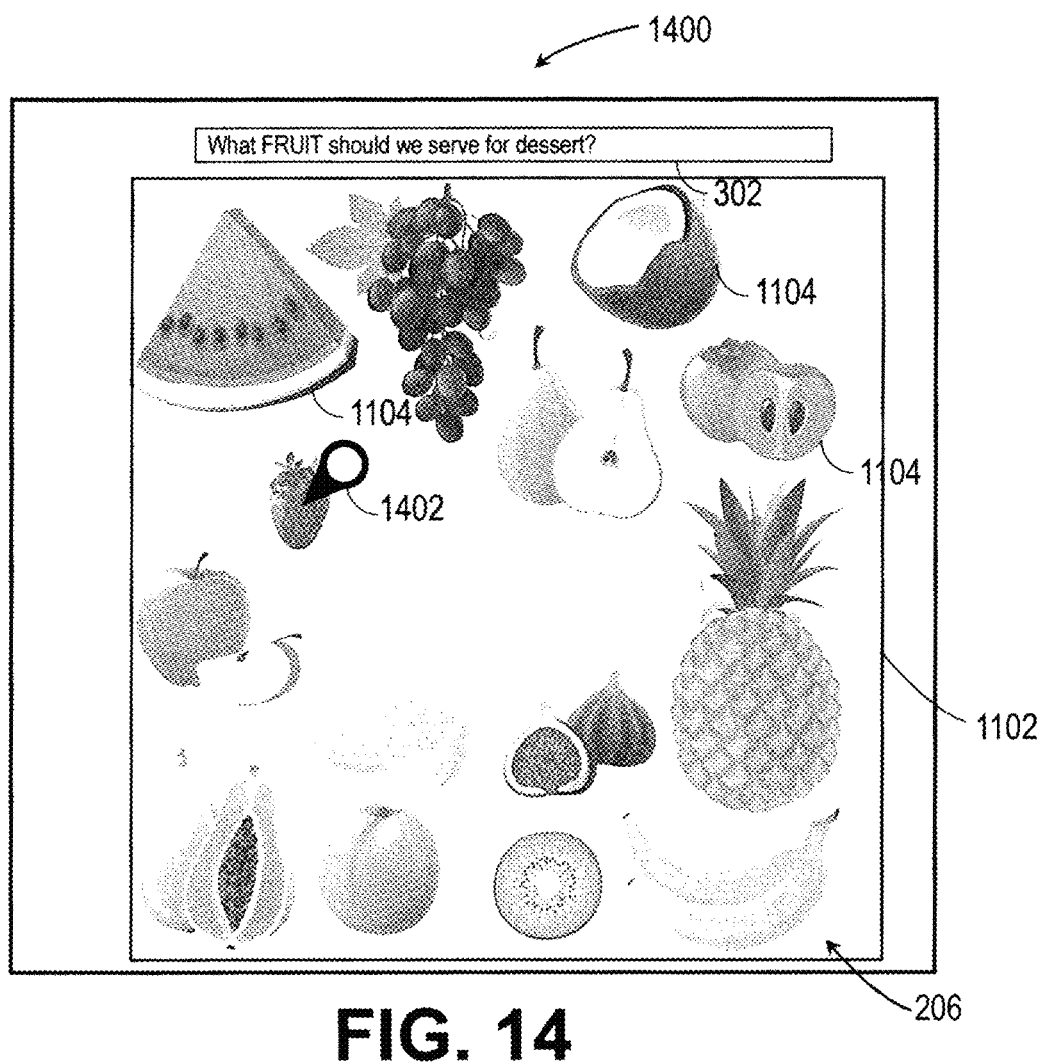
FIG. 14 is exemplary image target area, including a graphical pin, shown after a target point has been selected by a collaborative session.

The CIA software running on the computing devices 104 of each user then displays the graphical pin 1402 or other graphical indicator on the device 104, showing the location of the target point 1302 on the image 1102, as shown in FIG. 14 below. Because the users make their own visual interpretation of the image, they know it corresponds to a strawberry but the software need not have any data to that effect. This makes the process highly efficient.

Referring next to FIG. 14, an exemplary image target area 1400 with the graphical pin 1402 is shown after the target point 1302 has been selected by the collaborative session. Shown are the target area 206, the pointer 210, the question display 302, the target area image 1102, the plurality of target images 1104, and the graphical pin 1402.

The graphical pin 1402 is displayed upon image 1102 at the target point 1302 that was collaboratively selected by the real-time synchronous swarm of users. This indicates to all users that a strawberry was selected as the answer to the question, although the software need not know what was displayed at that portion of the single image 1102. This makes it highly efficient.

The CCS 102 software then stores information about the session, including the question asked, the image 1102, and the target point 1302 X-Y coordinates (TargetX, TargetY) in its database, so that future users can access the question and see the answer. The answer is displayed to future users as the image 1102 plus the graphical pin 1402 located at (TargetX, TargetY) coordinates upon the image 1102, referencing the known coordinate origin 1304. This allows for efficient data storage.

The method above is not just efficient, it's highly flexible. In addition to allowing one single image to include collections of discrete graphical objects like the fruits above, the method can be used to identify a location on one single image that is not comprised of unique and discrete objects but instead a continuum of selectable positions. For example, a group of engineers working on the design of a mechanical part could collaboratively work as swarm intelligence to identify a location of the weakest point on a graphical drawing of that mechanical part using methods and systems disclosed herein.

Other inventive configurations include the display of graphical maps or calendars such that a group of users can function as a swarm intelligence to collaboratively select a location on a map or a date on a calendar in response to a question posed to the group.

Figure 15:
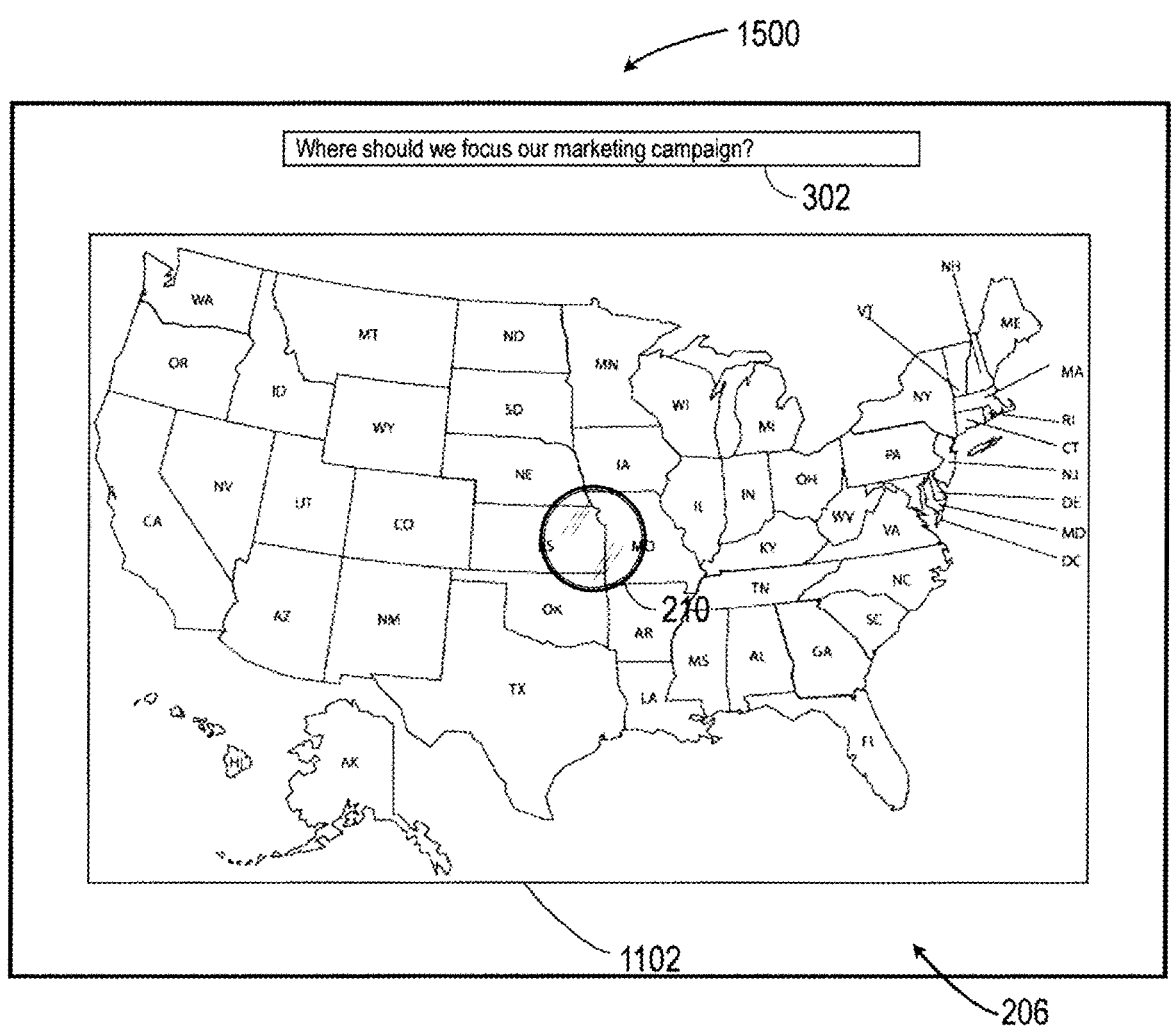
FIG. 15 is an exemplary map image target area shown prior to the start of a collaborative session.

Referring next to FIG. 15, an exemplary map image target area 1500 is shown prior to the start of a collaborative session. Shown are the target area 206, the question display 302, the pointer 210, and the target area image 1102.

As shown in the exemplary map image target area 1500 of FIG. 15, the system 100 enables one user to ask a question to the group of collaborative participants in the real-time synchronous swarm, said question including a textual prompt and the selection by the user of one map image. In preferred embodiments, the map image is selected by the user from a plurality of available map images. For example, the user chooses a USA map from among a plurality of other locative maps such as world maps and other country maps. In this example, the user asks "Where should we focus our Marketing Campaign?" (as shown in the question display 302) to a group of users who comprise a marketing team and who will tap their collaborative intelligence to provide an answer. During the subsequent collaborative session the group will then collaboratively control the pointer 210, collaboratively moving it over the image 1102. Using the methods described in FIGS. 9 and 10 above, the CCS 102 software determines when group has selected the target point 1302 on the map target area image 1102. Once collaboratively selected by the swarm, the graphical pin 1402 or other identifier is displayed on the image 1102 indicating the collaboratively selected location.

Figure 16:
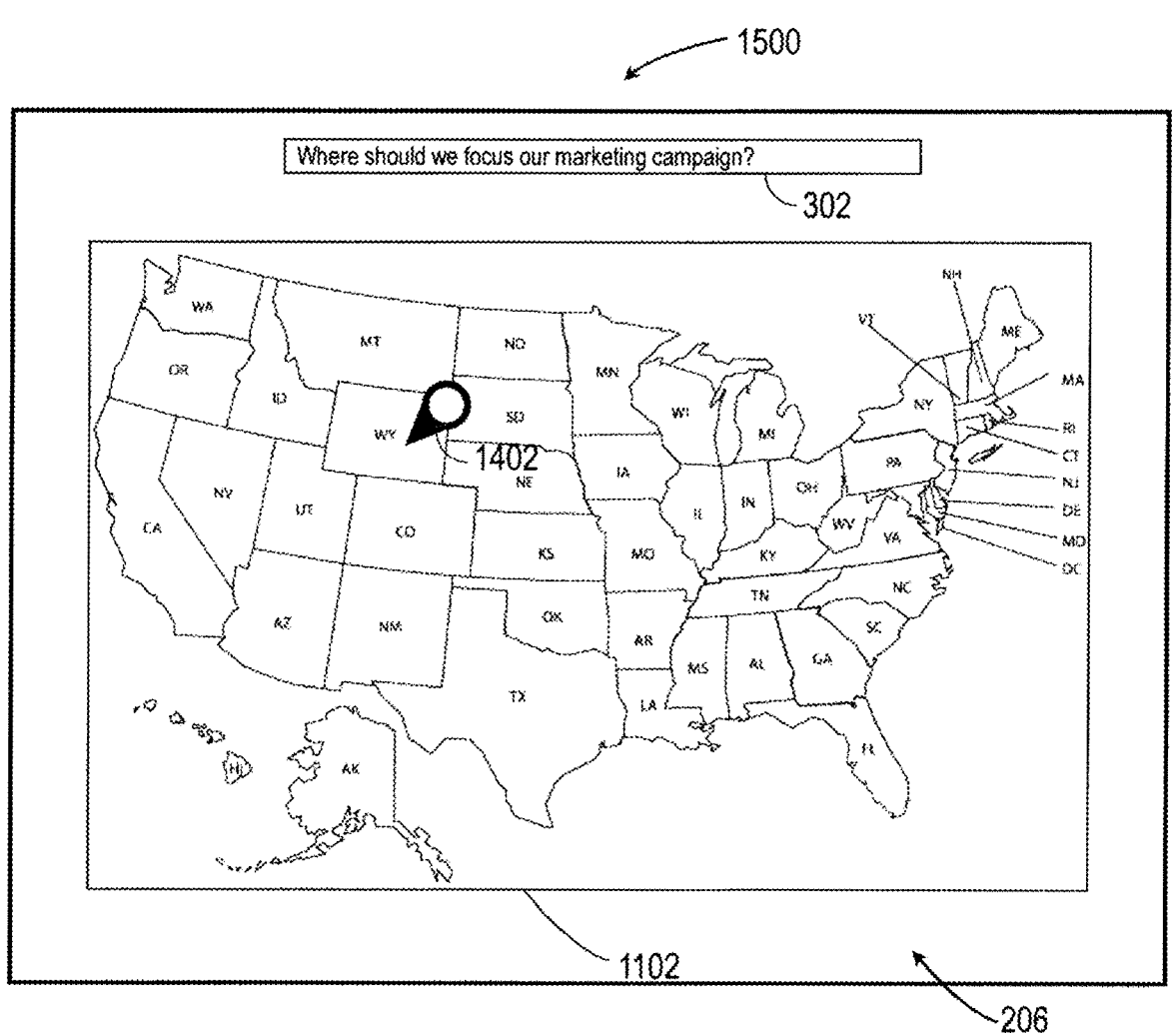
FIG. 16 is an exemplary map image target area shown after completion of the collaborative session.

Referring next to FIG. 16, an exemplary map image target area 1600 is shown after completion of the collaborative session of FIG. 15. Shown are the target area 206, the question display 302, the target area image 1102, and the graphical pin 1402.

Once the collaborative decision process is complete, the CCS 102 sends the coordinate location of the target point 1302 to the computing devices 104, and the graphical pin 1402 is displayed on the image 1102, indicating the target point location. The image 1102, the target point 1302 coordinate location and the question are stored in a database for later review. This data allows for a complete display of both question and response by simply positioning the graphical pin 1402 at the target point location on the image 1102.

Again, this is highly efficient because the CCS 102 software need not store information related to the relative location of particular places on the map, for the users can interpret that themselves based on the location of the graphical pin 1402 on the image 1102. This allows for efficient data passing and efficient data storage, as well as a highly versatile means for users to post pictures of all kinds as parts of questions without needing to characterize the pictures spatially. The users can use their shared interpretation of the picture content to do that.

Figure 17:
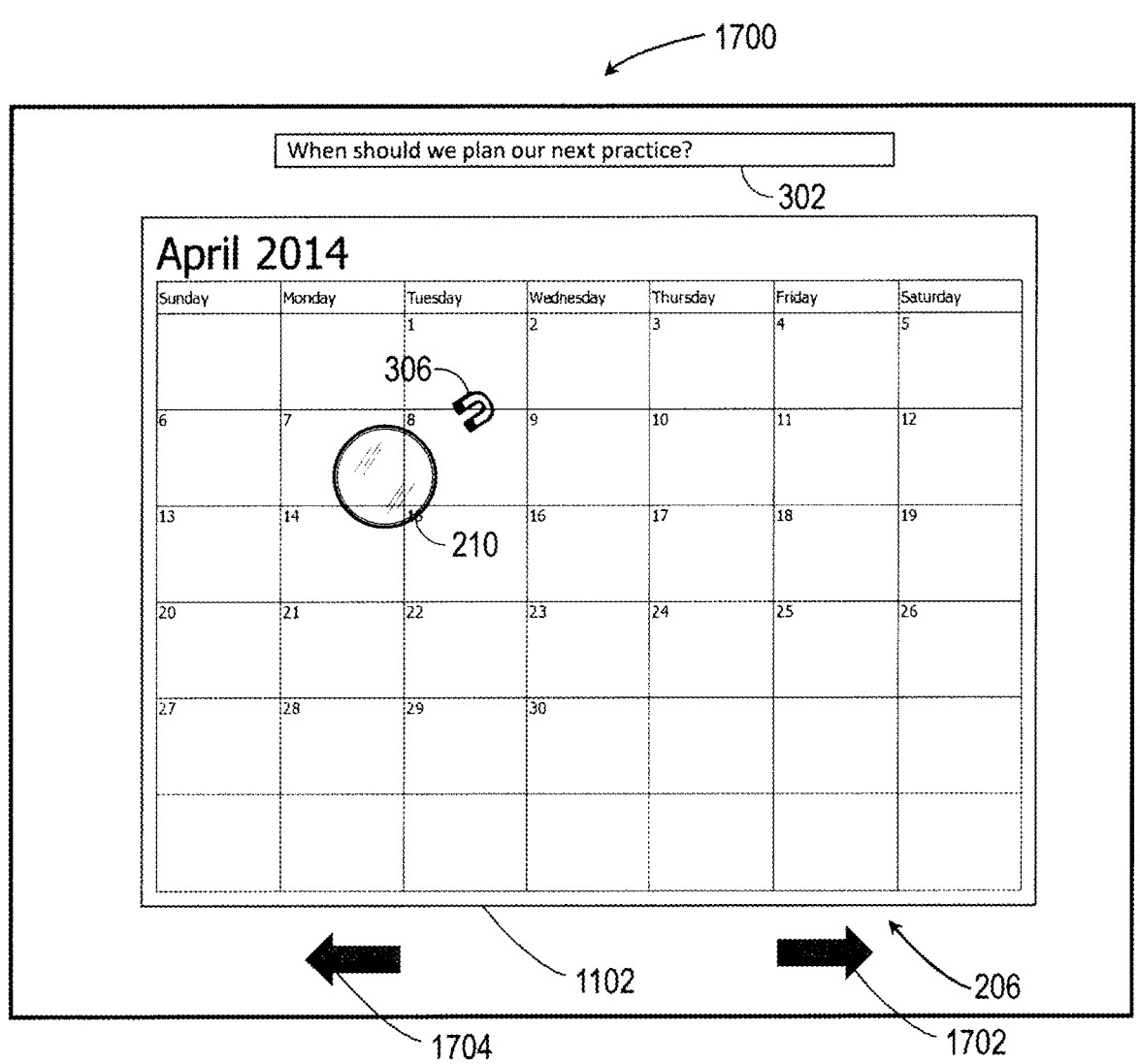
FIG. 17 is an exemplary calendar image target area shown during a collaborative session.

Referring next to FIG. 17, an exemplary calendar image target area 1700 is shown during a collaborative session. Shown are the target area 206, the question display 302, the pointer 210, the magnet icon 306, the target area image 1102, a forward arrow 1702 and a backward arrow 1704.

In the exemplary calendar target area 1700 of FIG. 17, the system enables one user to ask a question to the group of collaborative participants in a real-time synchronous swarm, said question including the textual prompt (as shown in the question display 302) and the selection of one calendar image 1102. In this example, the user asks "When should we plan our next practice?" to a group of users who comprise a softball team and who will tap their collaborative intelligence to provide the answer. The group collaboratively controls the pointer 210, positioning it over a target location on the calendar target area image 1102 selected by the question asker. Using the selection method of FIG. 9 and/or the selection method of FIG. 10 as described above, the CCS 102 software determines when the group has selected one target point 1302 on the calendar image 1102. Once collaboratively selected by the swarm, the graphical pin 1402 or other identifier is displayed indicating the collaboratively selected location. The users know this location corresponds with a particular date.

In some embodiments the users can also collaboratively control the puck 210 to land on the forward arrow 1702 or the backward arrow 1704, both included in the target area 206. The forward arrow 1702 and the backward arrow 1704, when selected, change the month of the calendar to a next month or previous month respectively. In the exemplary calendar target area 1700 of FIG. 17, the forward arrow 1702 and the backward arrow 1704 are positioned below the calendar target area image 1102.

As with the prior disclosed methods, the single image 1102 (in this case a calendar) are saved along with the selected target point 1302 and the posed question, providing a complete record of the question and answer that can be reviewed by users. Again, this is highly efficient because the software need not store information related to the relative location of particular days on the calendar, for the users can interpret that themselves based on the location of the graphical pin 1402 on the single image 1102.

Figure 18:
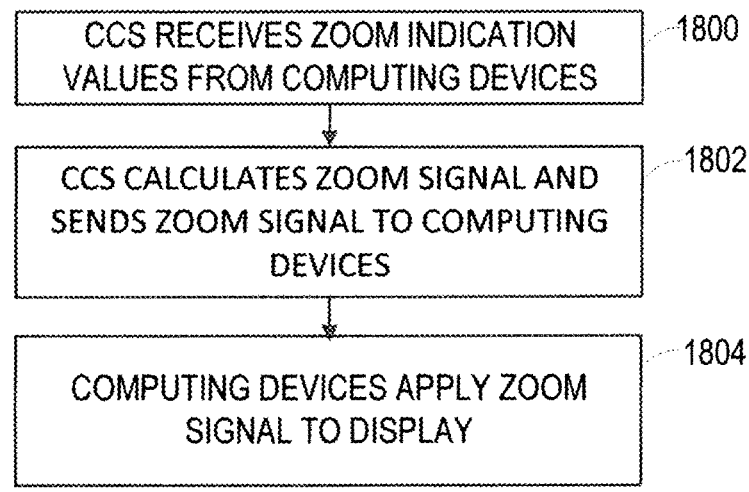
FIG. 18 is a flowchart diagram for a method for collaborative zooming during a collaborative session.

Referring next to FIG. 18, a flowchart for a method for collaborative zooming is shown. Shown are a receive zoom indications step 1800, a zoom change step 1802, and an apply zoom step 1804.

In some embodiments, the system allows a real-time swarm of collaborative users to not only identify the target point 1302 on the image 1102 but selectively zoom the image 1102 under synchronous group control. To support this, a novel yet intuitive collaborative user interface method had to be developed.

The collaborative zoom method of FIG. 18 involves defining a zoom-in region and a zoom-out region upon, affixed, or otherwise associated with and moving with the graphical pointer 210 that is responsive to collaborative pull from the plurality of users. By having the zoom-in region and the zoom-out region move with the graphical pointer 210, we maintain user focus and interaction with the pointer 210 (puck). This is essential because there is the plurality of users interacting with the pointer 210 at any one time, so if users disengage the puck 210 to engage a separate zoom feature, other users who have not disengaged will keep moving the puck 210, thus disrupting the true collaborative nature of control. This is the unique challenge for collaborative interfaces: to maintain all users engaged with the puck 210 as they transition from expressing the locative pull to expressing image zoom.

In one such embodiment, the zoom-in and zoom-out regions are only displayed and active when the motion of the puck 210 falls below the threshold speed and/or the group intent vector falls below the threshold force level. This ensures that zoom-in or zoom-out only happens when the puck 210 is approximately still, allowing the users to focus on the image zoom rather when image location is not changing significantly.

As for the display of the zoom-in and zoom-out regions, in preferred embodiments the regions move with the puck 210, always staying in close proximity to the puck 210, either close outside an outer boundary of the puck 210 or actually within the outer boundary of the puck 210. In some embodiments, the placement with respect to a center of the puck 210 is dependent upon the user's magnet icon 306 location with respect to the puck 210. For example, if the user's magnet icon 306 is above the puck 210, pulling upward, the zoom-in and zoom-out regions can be displayed above the puck 210 too, not far from the user's magnet icon 306. Similarly, if the user's magnet icon 306 is to the left of the puck 210, pulling leftwards, the zoom-in and zoom-out regions can be displayed to the left of the puck 210 as well, not far from the user's magnet icon 306. This allows the user to maintain his or her desired pull, and with very little change in motion, target either the zoom-in or zoom-out regions. In many embodiments, these regions are annotated with a standard convention such as "+" for zoom-in and "−" for zoom-out, which is generally well known in the art.

In the first receive zoom indications step 1800, the CIA software running on each computing device 104 determines if the user's graphical magnet icon 306 (or other user intent vector indicator) is within or on one of the zoom-in or zoom-out regions. If so, the CIA software running on the user's computing device 104 sends a signal to the CCS 102 software, representing that said user is making a zoom indication during the present time-step and indicating whether that zoom indication is a zoom-in or a zoom-out indication.

In one such embodiment, the CIA software sends a zoom indication value=+1 if the user is indicating zoom-in, a zoom indication value=−1 if the user is indicating zoom out, and sends a zoom indication value=0 if the user is not indicating any zoom. At each of a plurality of time-steps of the session, the CCS 102 software receives the zoom indication values from the plurality of users in the collaborative swarm via each of their computing devices 104 over said communication network.

The method then proceeds to the zoom change step 1802. During the zoom change step 1802, the CCS 102 software is operative to compute a summation, average, and/or median value of the plurality of received zoom indication values from the users.

Based upon the summation, average, and/or median value of the plurality of zoom indication values received from the plurality of synchronous users in the swarm, the CCS 102 software determines if the single image 1102 should be zoomed in, zoomed out, or unchanged in zoom for this time step. In response to this determination, the CCS 102 software sends a zoom signal to each of the plurality of computing devices 104, indicating if the single image 1102 should be zoomed in, zoomed out, or unchanged in zoom for the current time-step. Because these values are time-step related, they are generally conveyed as a delta zoom (i.e. an incremental change in zoom). In some such embodiments, the delta zoom is either a +1%, −1%, or 0% change in zoom for the current time step.

In response to the delta zoom value received from the CIA software running on each computing device 104, the CIA software on each device is operative to change the currently displayed zoom level of the single image 1102 by the defined delta zoom, in the final apply zoom step 1804. Thus if the delta zoom received from the CCS 102 software by each of the CIA clients running on the computing devices 104 was +1%, the CIA software would zoom-in on the single image 1102 by +1% during this time-step. If another +1% was received by the CIA software in the next time-step, the CIA software would zoom the single image 1102 by another +1% in the next time step.

It is important to note that substantially the same delta zoom value is sent to all computing devices 104 in a substantially simultaneous manner because this is a synchronous real-time closed loop system where all users are responding in real-time to the same change in zoom, and thereby changing their input for future time-steps. In this way, the users will be viewing the zoom synchronously, all of them adjusting whether they are targeting the zoom-in, zoom-out, or no zoom indicators based on how the image 1102 is zooming. In this way, they collaboratively form a zoom-controlling swarm that can converge in real-time upon a collectively desired zoom level. The process is fast and seamless, everyone feeling consequential. Thus, the users' perceptual system is closing the loop on one end, while the CSS 102 is closing the loop on the other end, allowing for all users to work as one as a real-time swarm.

The CCS 102 software also monitors maximum and minimum zoom limits such that the CCS 102 does not allow for delta zooms to be sent to computing devices 104 such that the delta zoom would drive the total current zoom level of the single image 1102 above the maximum zoom limit or below the min zoom limit.

In some embodiments the CCS 102 maintains a running average of zoom indication values received from the plurality of computing devices 104 across a series of time-steps. For example, if the server 102 is receiving data from the portable devices 104 at a rate of 60 reports per second, the running average could be set to compute the average zoom indication tally received across the last 6 time steps. This would give one average tally every tenth of a second. This helps smooth the zoom across user input, but is still fast enough on a human-time scales that it functions as a real-time closed loop system.

In alternate embodiments, collaborative zoom is accomplished by the plurality of users in a very different but also effective way. In such alternate embodiments, a zoom-in and zoom-out region is placed upon the target area 206 and is not engaged by the magnet icon 306 (as in the embodiments above) but instead is engaged by the pointer 210 (puck) itself. Thus, the users must collaboratively control the puck 210 to position it upon or within the designated zoom-in or zoom-out region on the target area 206 so as to cause the displayed image 1102 to zoom in or zoom out accordingly. Thus, if the collaborative swarm makes the collective decision to zoom in on an image 1102 (such as a map), they do so by moving the puck 210 onto or within the designated zoom-in area on the screen through the same real-time collaborative control as they would move the puck 210 onto other targets. This allows for simple implementation but does have a drawback compared to the prior embodiments, for it causes the puck 210 to leave the other activity it may have been engaged in, for example targeting locations on an image, to instead target the zoom-in or zoom-out region. This makes for a slower interface than the magnet controlled embodiments.

Figure 19:
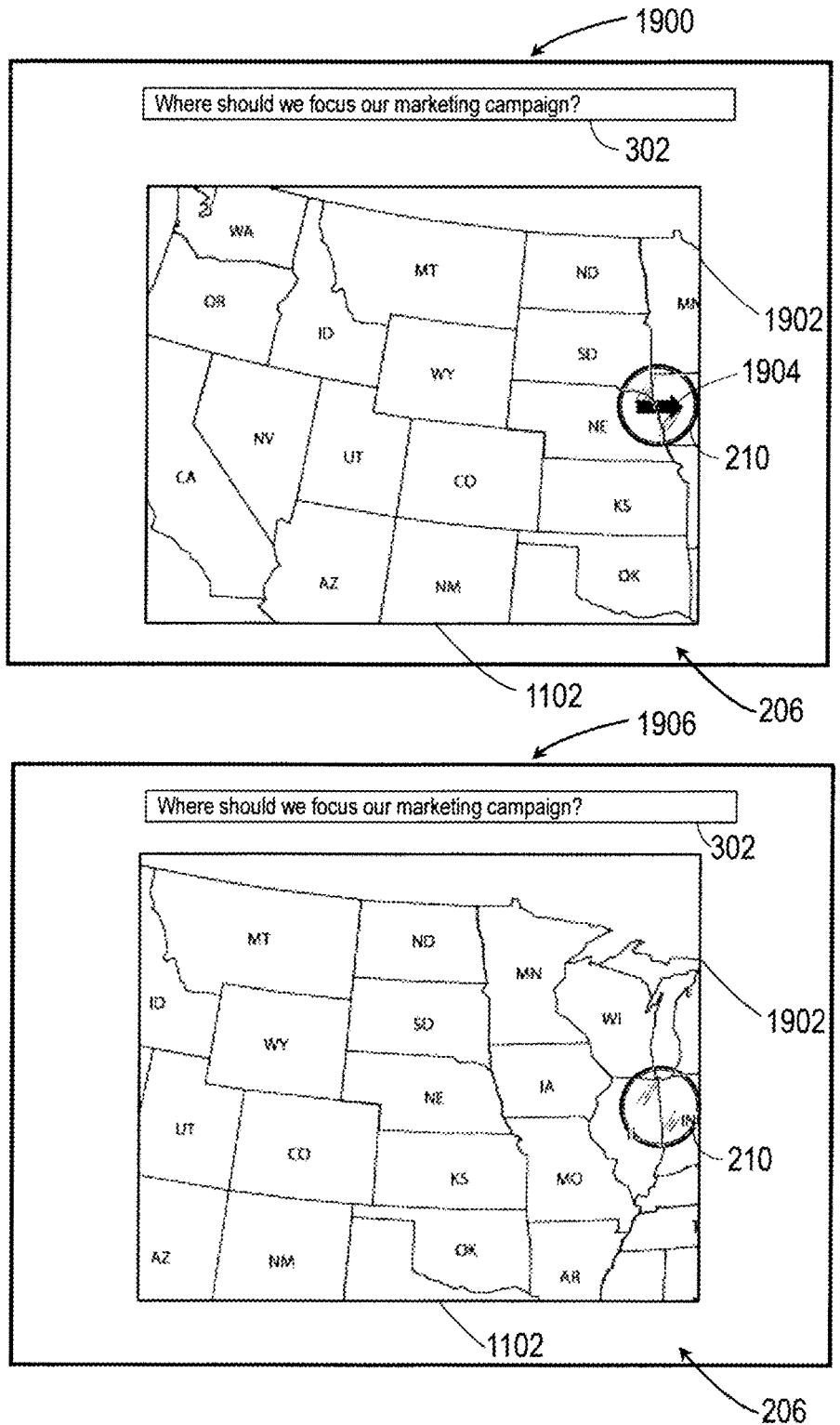
FIG. 19 is a panning-enabled map target area sequence during a collaborative session.

Referring next to FIG. 19, a panning-enabled map target area sequence is shown. Shown are the question display 302, the target area 206, the pointer 210, the target area image 1102, a first map target area 1900, a panning boundary 1902, a group intent direction arrow 1904, and a second map target area 1906.

In some embodiments, the system 100 allows the real-time swarm of collaborative users to selectively pan the image 1102 or set of images that are larger than the target area 206. For example, a large map in which areas of the map are beyond the limits of the target area 206 requires panning to view the hidden locations. To enable the collaborative swarm of users to pan the image 1102, a novel method has been devised in which the graphical puck 210, when hitting up against the panning boundary 1902, is stopped from moving. In the embodiment shown in FIG. 19, the panning boundary 1902 coincides with a display extent of a portion of the image 1102, but the panning boundary 1902 may have a different shape and/or location. If the users collaboratively continue to pull against the panning boundary 1902 that is stopping them, the image 1102 is panned in the opposite direction to the collaborative pull. In preferred embodiments, a speed of the panning of the image 1102 in said opposite direction is based at least in part upon the group intent vector imparted by the swarm. Thus the magnitude of the net pull on the puck 210 by the users is used to control the speed of panning such that the larger the net force pulling against the panning boundary 1902, the faster the panning in the inverse direction. This gives the collaborative group an intuitive proportional control of panning speed. And because the puck 210 can be pulled up against all four of the panning boundaries 1902, it also gives control over direction. In the corners, the puck 210 can be used to pull against two panning boundary 1902 edges at once, each proportional to the pull against the panning boundary 1902, thus allowing for diagonal panning. As shown in FIG. 19, the first map target area 1900 includes a portion of the larger image. In the example for FIG. 19, the larger image is a map of the U.S. and the image 1102 is displaying a portion of the larger map image, with the rest of the map outside the limits of the displayed target area image 1102. The first map target area 1900 includes the pointer 210, which has been collaboratively pulled against the panning boundary 1902, in this example the right-hand edge of the rectangular panning boundary 1902. The group intent vector is indicated by the group intent direction arrow 1904, and is oriented horizontally and pointed to the right, indicating a right-hand directional intent. It will be understood that the group intent directional arrow is for understanding of the group intent vector only, and would not normally be displayed on the computing devices 104. The second map target area 1906 shows the panned target area 206 as a result of the pointer 210 location and concurrent group intent vector. The image 1102 has panned across the larger map image in an opposite direction to the direction of the group intent direction arrow 1904, i.e. to the left.

To support collaboratively controlled panning among the plurality of users engaged in real-time synchronous control, the method has been devised in which the collaboratively controlled puck 210 is prevented from exiting the panning boundaries 1902, instead butting up against the edges. As shown in the first map target area 1900, the puck 210 has been pulled under collaborative control from a center of the displayed image 1102 to the rightmost edge, butting up against a limit visually depicted by a right edge of the panning boundary 1902. If the users continue to apply collaborative force to the puck 210, instead of the puck 210 moving past the panning boundary 1902, the CCS 102 and CIA software are configured to instead pan the image 1102 in the opposite direction to the collaborative pull of the puck 210. Thus if the users are collaboratively pulling the puck 210 rightward with a group intent vector that opposes the panning boundary 1902, the CIA and CSS 102 software work in combination to pan the image 1102 on all user screens in the opposite (leftward) direction. Further, the speed of panning in the leftward direction is implemented such that a panning magnitude is proportional to the magnitude of the group intent vector in the rightward direction. If the users are pulling on the puck 210 at an angle that's not directly orthogonal to the panning boundary 1902, only that component of force of the group intent vector is used to control the leftward panning.

In this way, users can move the puck 210 under collaborative control across the image 1102 and when the puck 210 reaches a limit of travel (for example the panning boundary 1902), the puck 210 is prevented from moving further in that direction of travel, the CCS 102 software being configured instead to pan the image 1102 in the opposite direction, with a speed proportional to the magnitude of the collaborative group intent vector as it pulls against the barrier to motion. And because the puck 210 can be pulled up against all four of the panning boundary 1902 edges of the image, it also gives the collaborative swarm real-time control over the direction of panning. To pan the image 1102 rightward, the collaborative group is enabled to pull the puck 210 against the left-side edge of the panning boundary 1902, the stronger the collaborative pull against the left-side edge the faster the rightward panning. To pan the image 1102 upward, the collaborative group must pull the puck 210 against the bottom edge of the panning boundary 1902, the stronger the collaborative pull against the bottom edge the faster the upward panning. To pan the image downward, the collaborative group pulls the puck 210 against the top edge of the panning boundary 1902, the stronger the collaborative pull against the top barrier the faster the downward panning. In the corners, the puck 210 can be used to pull against two panning boundaries 1902 at once, each proportional to the pull against the panning boundary 1902, thus allowing for diagonal panning. In some embodiments, diagonal panning is enabled at all points on the panning boundary 1902. To achieve this, we make the panning boundary 1902 'sticky' so that the puck 210 does not slide along the edge of the panning boundary 1902. Thus, when the puck 210 touches the panning boundary 1902 and is pulled into the panning boundary 1902 the puck 210 stays stationary at the tangent location. The panning then occurs diagonally, in the inverse direction to the vector direction. When the puck 210 is pulled away from the panning boundary 1902, the puck 210 releases (is no longer stationary at the tangent location). This enables diagonal panning in a simple and intuitive framework.

In some embodiments, the panning boundary 1902 is not visibly displayed. The users experience the puck 210 reaching the panning boundary 1902 by the puck motion stopping (or slowing), and if the group continues to collaboratively pull in that direction, the image 1102 pans in the opposite direction at a speed proportional to said collaborative pulling. In some embodiments, the puck 210 may be limited to a small region in the center of the image 1102, the panning boundary 1902 being reached before the puck 210 reaches the edge of the actual displayed image 1102. The panning boundary 1902 may be of a variety of shapes, for example a circular region at the center of the image 1102. The panning boundary 1902 may be invisible, but still prevents the puck 210 from leaving.

Figure 20:
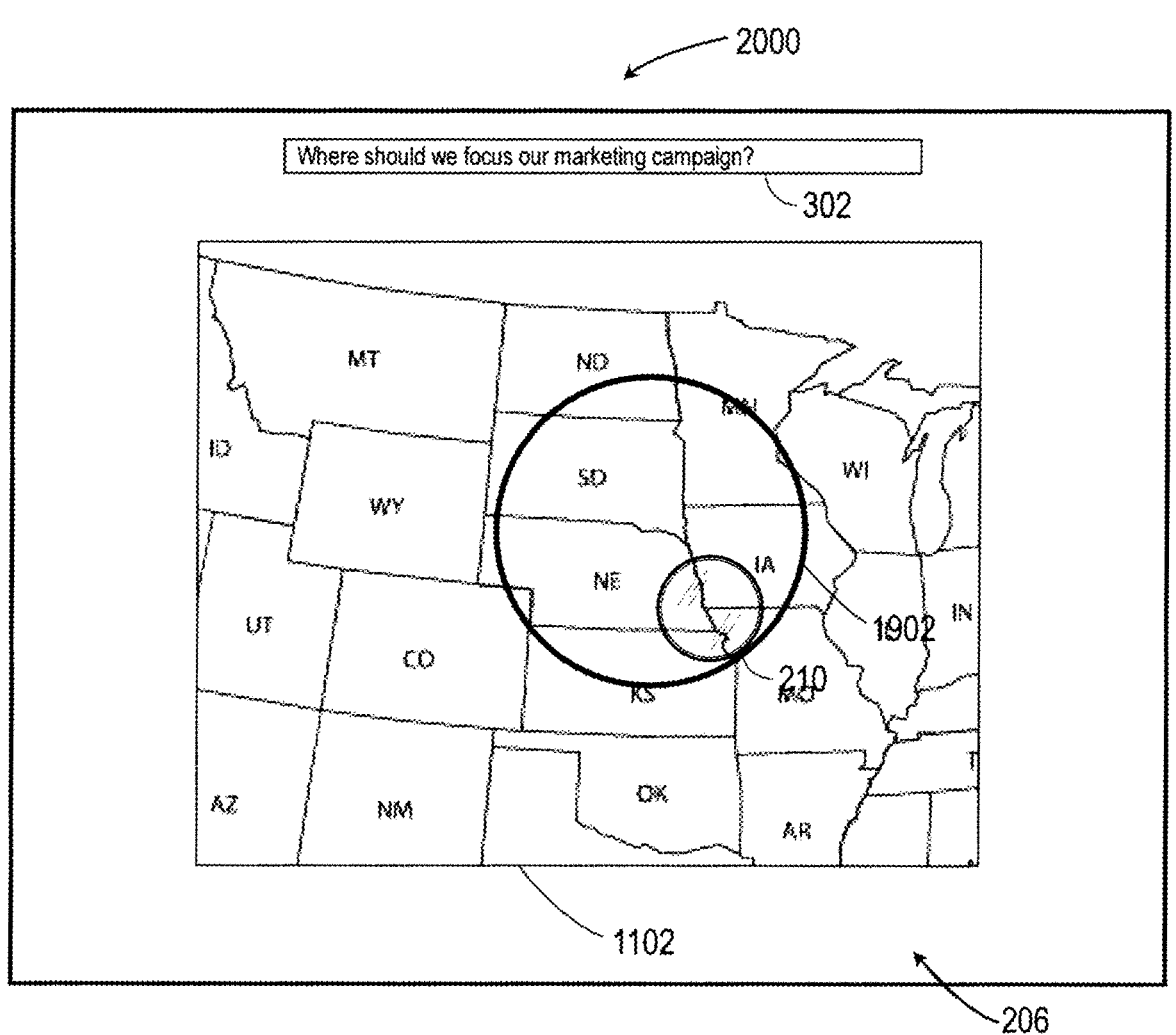
FIG. 20 is an exemplary map target area including a circular boundary during a collaborative session.

Referring next to FIG. 20, an exemplary map target area 2000 including a circular boundary is shown. Shown are the question display 302, the pointer 210, the target area 206, the image 1102, and the panning boundary 1902.

As previously described, the panning boundary 1902 need not be coincident with the extent of the image 1102. As shown in FIG. 20, the panning boundary 1902 is a circular boundary surrounding the puck 210 and implemented by the CCS 102 such that the puck 210 is unable to pass out of the circular panning boundary 1902. When hitting up against the panning boundary 1902 (which may or may not be visual), the users may continue to collectively pull the puck 210 in a direction that opposes the panning boundary 1902 as indicated by their group intent vector. The CCS 102 software will not allow the puck 210 to substantially pass the panning boundary 1902, but the CIA and CCS 102 software are configured to pan the image 1102 in a direction opposite to the group intent vector, with a speed proportional to the group intent vector.

In some embodiments wherein the puck 210 is bounded to a small region at the center of the displayed image 1102, a virtual restoring force may be applied by the CCS 102 software on the puck 210, said virtual restoring force acting to return the puck 210 to the center of the image 1102 with a magnitude proportional to its distance from the center of the image 1102. This can be represented as "virtual gravity" pulling the puck 210 back to center. The panning is then implemented such that the direction of panning is opposite to the direction of the group intent vector generated by the group of users as it pulls against gravity, the speed of the panning proportional to the magnitude of the group intent vector generated as the collaborative group pulls against gravity. In this way, a virtual gravitational force can be used instead of a bounding line, edge, or surface.

In some such panning embodiments, the portions of the larger image that are off screen and panned can be more than just a single image or a set of images, but a set of targets. For example, in one novel embodiment, the present invention is used to allow a collaborative intelligence to sentences by selecting a string of words, each of said words being on a target field as a selectable target. This solves the problem that only a small number of words can fit on the screen at once, limiting the vocabulary presented to users. Using the panning methods above, a large number of words can be included on a larger target area that extends far off the screen, the target words being selectable under collaborative control by first panning to that portion of the larger target area, then by targeting the word with the pointer 210 (as disclosed previously).

For example, a full 850 words of the Ogden Basic English vocabulary could be presented on the larger target area, with a portion of the larger target area shown as the target area 206, each of the words being a discrete answer choice 208. A collaborative swarm of users would then be enabled to target any one of the words in the vocabulary by panning and targeting. In some embodiments, the words are arranged alphabetically which allows users to know which way to pan to get towards a desired word that is off screen. In other embodiments, collaborative panning can be combined with collaborative zooming such that a swarm of users can zoom out, quickly pan to a region, then zoom in to find a particular word.

While many embodiments are described herein, it is appreciated that this invention can have a range of variations that practice the same basic methods and achieve the novel collaborative capabilities that have been disclosed above. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A collaborative targeting system for enabling a plurality of users to jointly select a coordinate location within a graphical image during a real-time session, the system comprising:

a collaboration server configured to run a collaboration server application and to exchange real-time data with each of a plurality of networked computing devices, each of the computing devices configured to:
  display a graphical image;
  display a collaboratively controlled graphical pointer upon the graphical image;
  receive, repeatedly in real-time, from the collaboration server, a pointer location;
  update, repeatedly in real-time, the displayed location of the collaboratively controlled graphical pointer upon the graphical image in response to the received pointer location, the displayed location being substantially synchronized among the plurality of computing devices;
  receive, repeatedly in real-time, user input through a user interface, the user input indicating at least in part, a desired direction of motion of the collaboratively controlled graphical pointer; and
  send, repeatedly in real-time, a representation of the desired direction of motion to the central collaboration server;

wherein the collaboration server application is configured to:
  receive, repeatedly in real-time, the representation of the user input from more than one of the plurality of computing devices;
  determine, repeatedly in real-time, a group intent vector from the user input received from the more than one of the plurality of computing devices, the group intent vector indicating a collaboratively desired speed and direction of the collaboratively controlled graphical pointer;
  determine, repeatedly in real-time, the updated pointer location for the collaboratively controlled graphical pointer based at least in part upon the group intent vector;
  send, repeatedly in real-time, the pointer location to the plurality of computing devices;
  determine, repeatedly, whether a speed of the collaboratively controlled graphical pointer has fallen below a threshold value;
  identify a target location upon the graphical image based at least in part upon the determination that the speed of the collaboratively controlled graphical pointer has fallen below the threshold value; and
  send an indication of the target location to at least one of the computing devices.

2. A collaborative targeting system for enabling a plurality of users to jointly select a coordinate location within a graphical image during a real-time session, the system comprising:

a collaboration server configured to run a collaboration server application and to exchange real-time data with each of a plurality of networked computing devices, each of the computing devices configured to:
  display a graphical image;
  display a collaboratively controlled graphical pointer upon the graphical image;
  receive, repeatedly in real-time, from the collaboration server, a pointer location;
  update, repeatedly in real-time, the displayed location of the collaboratively controlled graphical pointer upon the graphical image in response to the received pointer location, the displayed location being substantially synchronized among the plurality of computing devices;
  receive, repeatedly in real-time, user input through a user interface, the user input indicating at least in part, a desired direction of motion of the collaboratively controlled graphical pointer; and
  send, repeatedly in real-time, a representation of the desired direction of motion to the central collaboration server;

wherein the collaboration server application is configured to:
  receive, repeatedly in real-time, the representation of the user input and from more than one of the plurality of computing devices;
  determine, repeatedly in real-time, a group intent vector from the user input received from the more than one of the plurality of computing devices, the group intent vector indicating a collaboratively desired speed and direction of the collaboratively controlled graphical pointer;
  determine, repeatedly in real-time, the updated pointer location for the collaboratively controlled graphical pointer based at least in part upon the group intent vector;
  send, repeatedly in real-time, the pointer location to the plurality of computing devices;
  determine, repeatedly, whether a magnitude of the group intent vector has fallen below a threshold value;
  identify a target location upon the graphical image based at least in part upon the determination that the magnitude of the group intent vector has fallen below the threshold value for more than a threshold amount of time; and
  send an indication of the target location to at least one of the computing devices.

* * * * *